United States Patent
Murray et al.

(10) Patent No.: US 12,252,988 B2
(45) Date of Patent: Mar. 18, 2025

(54) MICROWAVE-BASED MINING SYSTEMS AND METHODS WITH ROBOTIC ARM WAVEGUIDE

(71) Applicant: Off-World, Inc., Pasadena, CA (US)

(72) Inventors: James Jason Murray, Liege (BE); Jeandré du Plessis, Johannesburg (ZA); Petroné Hester Bezuidenhout, Johannesburg (ZA); Ryan Dennis Beech, Johannesburg (ZA); Marco Delport, Johannesburg (ZA); Mohsen Yazdani, Los Angeles, CA (US); Sergio Pieiga, III, Los Angeles, CA (US)

(73) Assignee: Off-World, Inc., Pasadena, CA (US)

( * ) Notice: Subject to any disclaimer, the term of this patent is extended or adjusted under 35 U.S.C. 154(b) by 110 days.

(21) Appl. No.: 17/651,733

(22) Filed: Feb. 18, 2022

(65) Prior Publication Data
US 2022/0268156 A1    Aug. 25, 2022

Related U.S. Application Data

(60) Provisional application No. 63/152,253, filed on Feb. 22, 2021, provisional application No. 63/152,248, (Continued)

(51) Int. Cl.
*E21C 37/16*    (2006.01)
*E21D 9/10*    (2006.01)
(Continued)

(52) U.S. Cl.
CPC .......... *E21C 37/16* (2013.01); *E21D 9/1073* (2013.01); *B25J 18/00* (2013.01); *E21C 37/18* (2013.01);
(Continued)

(58) Field of Classification Search
CPC .......... H01P 1/063; H01P 1/062; H01P 1/064; H01P 1/066; H01P 1/067; E21C 37/16;
(Continued)

(56) References Cited

U.S. PATENT DOCUMENTS 2,433,011 A    12/1947    Zaleski
2,830,276 A    4/1958    Zaleski
(Continued)

FOREIGN PATENT DOCUMENTS

CN    104563883    4/2015
CN    107035316    8/2017
(Continued)

OTHER PUBLICATIONS

English Language Machine Translation of Li et al., CN-107218054-A, published Sep. 29, 2017 (5 pages) (Year: 2017).*
(Continued)

*Primary Examiner* — Janine M Kreck
*Assistant Examiner* — Michael A Goodwin
(74) *Attorney, Agent, or Firm* — Knobbe, Martens, Olson & Bear, LLP

(57) ABSTRACT

A system for excavating a rock face using microwaves. The system may include a microwave generator, an articulable robotic arm with a plurality of rotatably connected rigid waveguide segments, an applicator attached to a distal end of the robotic arm, and a robotic control system. The system produces microwaves with the microwave generator and moves the robotic arm such that the applicator moves along the rock face as the microwaves exit the applicator to precondition the rock face for excavation. Various patterns of microwave treatment, and controls based on sensor feedback, may be implemented.

27 Claims, 27 Drawing Sheets

Related U.S. Application Data filed on Feb. 22, 2021, provisional application No. 63/152,294, filed on Feb. 22, 2021.

(51) Int. Cl.
| | |
|---|---|
| B25J 18/00 | (2006.01) |
| E21C 37/18 | (2006.01) |
| H01Q 21/00 | (2006.01) |
| H05B 6/70 | (2006.01) |

(52) U.S. Cl.
CPC ........... *H01Q 21/005* (2013.01); *H05B 6/701* (2013.01); *H05B 6/707* (2013.01)

(58) Field of Classification Search
CPC ........ E21C 37/18; E21C 35/24; E21C 35/282; E21C 35/302; E21D 9/1073; E21D 9/108; E21B 7/14; E21B 7/15; B25J 18/00; B25J 18/02; B25J 18/04; H05B 6/701; H05B 6/707; H01Q 21/005
See application file for complete search history.

(56) References Cited

U.S. PATENT DOCUMENTS

| | | | |
|---|---|---|---|
| 3,430,021 | A | 2/1969 | Watson |
| 3,443,051 | A | 5/1969 | Puschner |
| 3,784,777 | A | 1/1974 | Soulier |
| 4,020,431 | A | 4/1977 | Saunders |
| 4,222,017 | A | 9/1980 | Foldes |
| 4,365,252 | A | 12/1982 | Hubert |
| 4,475,023 | A | 10/1984 | Iwabuchi et al. |
| 4,647,884 | A | 3/1987 | Lang et al. |
| 4,848,482 | A | 7/1989 | Oberle et al. |
| 4,856,598 | A | 8/1989 | Oberle et al. |
| 5,003,144 | A | 3/1991 | Lindroth et al. |
| 5,198,828 | A | 3/1993 | West et al. |
| 5,245,301 | A | 9/1993 | Portrait et al. |
| 5,442,329 | A | 8/1995 | Ghosh et al. |
| 5,635,143 | A * | 6/1997 | White .................... E01C 23/08 588/900 |
| 5,671,045 | A | 9/1997 | Woskov et al. |
| 6,114,676 | A | 9/2000 | Jerby et al. |
| 6,377,872 | B1 | 4/2002 | Struckman |
| 7,410,485 | B1 | 8/2008 | Fink et al. |
| 8,547,290 | B2 | 10/2013 | Schertz et al. |
| 8,976,072 | B2 | 3/2015 | Lenormand et al. |
| 9,013,359 | B2 | 4/2015 | Lenormand et al. |
| 9,970,246 | B2 | 5/2018 | Price Hoelscher et al. |
| 10,103,417 | B2 | 10/2018 | Gomberg |
| 10,428,654 | B2 | 10/2019 | Feng et al. |
| 10,812,142 | B2 | 10/2020 | Vannucci et al. |
| 11,028,647 | B2 | 6/2021 | Batarseh |
| 11,222,770 | B2 | 1/2022 | Kamarehi et al. |
| 2002/0090268 | A1 | 7/2002 | Haller |
| 2005/0127068 | A1 | 6/2005 | Tang et al. |
| 2007/0191825 | A1 | 8/2007 | Cronin et al. |
| 2008/0093358 | A1 | 4/2008 | Lee et al. |
| 2009/0321132 | A1 | 12/2009 | Ouellet et al. |
| 2010/0258429 | A1 | 10/2010 | Ugolin |
| 2011/0095959 | A1 | 4/2011 | Schertz et al. |
| 2012/0010609 | A1 | 1/2012 | Deem et al. |
| 2012/0235882 | A1 | 9/2012 | Iverson et al. |
| 2012/0287006 | A1 | 11/2012 | Lenormand et al. |
| 2013/0057431 | A1 | 3/2013 | Lenormand et al. |
| 2013/0081875 | A1 | 4/2013 | Hyde et al. |
| 2013/0123772 | A1 | 5/2013 | Bonn et al. |
| 2013/0223931 | A1 * | 8/2013 | Hegg .................... E01C 23/065 404/95 |
| 2015/0130565 | A1 * | 5/2015 | Henderson .............. H01P 1/062 333/257 |
| 2016/0244861 | A1 * | 8/2016 | Hyde ...................... H05B 6/68 |
| 2016/0333691 | A1 * | 11/2016 | Puura ...................... G05D 1/024 |
| 2018/0214205 | A1 | 8/2018 | Williams et al. |
| 2019/0040741 | A1 * | 2/2019 | Feng ....................... E21C 37/16 |
| 2020/0063040 | A1 | 2/2020 | Soane et al. |
| 2020/0128837 | A1 | 4/2020 | Dev et al. |
| 2020/0195304 | A1 | 6/2020 | Vannucci et al. |
| 2020/0240267 | A1 | 7/2020 | Sercel et al. |
| 2021/0262455 | A1 | 8/2021 | Hummelt |
| 2022/0268155 | A1 | 8/2022 | Murray et al. |
| 2022/0268157 | A1 | 8/2022 | Murray et al. |

FOREIGN PATENT DOCUMENTS

| | | | | |
|---|---|---|---|---|
| CN | 107218054 | A * | 9/2017 | ............... E21D 9/10 |
| CN | 111146546 | | 5/2020 | |
| CN | 111163545 | A * | 5/2020 | ............... E21D 9/00 |
| CN | 111636874 | A * | 9/2020 | ............. E21C 35/24 |
| CN | 111934061 | | 11/2020 | |
| CN | 112302535 | | 2/2021 | |
| CN | 213714112 | | 7/2021 | |
| CN | 113090268 | | 1/2022 | |
| EP | 0 284 911 | | 10/1988 | |
| EP | 0 266 292 | | 7/1991 | |
| EP | 0 514 251 | | 8/1995 | |
| EP | 1 490 525 | | 12/2007 | |
| EP | 2 232 624 | | 8/2011 | |
| EP | 2 345 013 | | 4/2017 | |
| EP | 2 532 046 | | 3/2020 | |
| EP | 2 532 050 | | 5/2020 | |
| GB | 1 216 654 | | 12/1970 | |
| WO | WO 97/013141 | | 4/1997 | |
| WO | WO 99/056642 | | 11/1999 | |
| WO | WO 00/049957 | | 8/2000 | |
| WO | WO 2004/112628 | | 12/2004 | |
| WO | WO 2009/083440 | | 7/2009 | |
| WO | WO 2011/095384 | | 8/2011 | |
| WO | WO 2011/095425 | | 8/2011 | |
| WO | WO 2021/103768 | | 6/2021 | |
| WO | WO 2022/178220 | | 8/2022 | |
| WO | WO 2022/178221 | | 8/2022 | |
| WO | WO 2022/178222 | | 8/2022 | |

OTHER PUBLICATIONS

International Search Report and Written Opinion in PCT/US2022/016934 dated Jun. 22, 2022.

International Search Report and Written Opinion in PCT/US2022/016932 dated May 16, 2022.

International Search Report and Written Opinion in PCT/US2022/016933 dated Jun. 2, 2022.

Teimoori et al., "Twenty Years of Experimental and Numerical Studies on Microwave-Assisted Breakage of Rocks and Minerals—A Review", Nov. 30, 2020, https://arxiv.org/ftp/arxiv/papers/2011/2011.14624.pdf, pp. 43.

Brodie et al., "Development of Microwave Slow-Wave Comb Applicators for Soil Treatment at Frequencies 2.45 and 0.922 GHz (Theory, Design, and Experimental Study)", Agriculture, 2020, vol. 10, No. 604, pp. 17.

Flexible Waveguide, Microwaves101.com, 2015, pp. 4. https://www.microwaves101.com/encyclopedias/flexible-waveguide.

Hassani et al., "The Influence of Microwave Irradiation on Rocks for Microwave-Assisted Underground Excavation", Journal of Rock Mechanics and Geotechnical Engineering, 2016, vol. 8, pp. 15.

Hilton et al., "The Potential of High Power Lasers for Tube Cutting and Concrete Scabbling in Nuclear Decommissioning", TWI Global, Jan. 28, 2014, pp. 6. https://web.archive.org/web/20140128160659/http://www.twi-global.com/technical-knowledge/published-papers/the-potential-of-high-power-lasers-for-tube-cutting-and-concrete-scabbling-in-nuclear-decommissioning/.

Kahraman et al., "Microwave-Assisted Hard Rock Excavation", TunnelTalk, Jan. 25, 2018, pp. 6. https://www.tunneltalk.com/TunnelTECH-Jan2018-Microwave-assisted-hard-rock-excavation.php.

Kubel, Ed., "Advancements in Microwave Heating", IndustrialHeating.com, Jan. 2005, pp. 43-53.

Lu et al., "The Microwave-Induced Fracturing of Hard Rock", Rock Mechanics and Rock Engineering, 2019, pp. 16.

(56) References Cited

OTHER PUBLICATIONS

Nekoovaght et al., "Microwave Assisted Rock Breakage for Space Mining", Earth and Space 2014, American Society of Civil Engineers, 2015, pp. 414-423.
Richardson Electronics, "General Guidelines for the Configuration and Selection of Microwave Generators and Waveguide Components", Aug. 23, 2016, pp. 6. https://web.archive.org/web/20160823201513/https://www.relltubes.com/filebase/en/src/Literature/Configuration-and-Selection-of-MicrowaveGenerators-and-Waveguide-Components.pdf.
Rotary Joints, Microwaves101.com, Mar. 21, 2015, pp. 3. https://web.archive.org/web/20150321215951/https://www.microwaves101.com/encyclopedias/rotary-joints.
Tang et al., "Study of 5.8 GHz Magnetron in Asphalt Pavement Maintenance", Journal of Electromagnetic Waves and Applications, vol. 22, No. 14, 2008, pp. 1975-1984.

* cited by examiner

MICROWAVE-BASED MINING SYSTEMS AND METHODS WITH ROBOTIC ARM WAVEGUIDE

CROSS REFERENCE

Any and all applications for which a foreign or domestic priority claim is identified in the Application Data Sheet as filed with the present application are hereby incorporated by reference under 37 CFR 1.57. This application claims the benefit of U.S. Provisional Patent App. No. 63/152,294 titled "APPLICATION OF MICROWAVE ENERGY DIRECTLY TO A ROCK FACE UNDERGROUND" and filed on Feb. 22, 2021, of U.S. Provisional Patent App. No. 63/152,248 titled "ARTICULATED WAVEGUIDE" and filed on Feb. 22, 2021, and of U.S. Provisional Patent App. No. 63/152,253 titled "MICROWAVE ENERGY APPLICATOR" and filed on Feb. 22, 2021, the entireties of each of which is hereby incorporated by reference for all purposes and forms a part of this specification.

BACKGROUND

Field

This disclosure generally relates to mining, in particular to systems and methods for weakening or excavating rock or other materials through the application of microwave heating using an articulable robotic arm waveguide.

Related Art

The application of microwaves to rock may serve to weaken certain types of rock, including those frequently encountered during excavation and mining, by inducing fractures within the rock. These fractures form based on the tremendous stresses and strains created by differential thermal expansion of the rock and against which rock has a generally very weak resistance. Such thermally fractured rock is more easily crushed or excavated and requires less energy and/or less time for further excavation (e.g., using mechanical tools such as drills or chisels) than untreated rock. While research regarding the microwave heat treating of rock has been conducted for several decades, it has never resulted in a commercially viable application due to complexity and costs of existing solutions. Accordingly, a need exists for improved systems and methods for the microwave preconditioning of rock that overcomes these and other drawbacks.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after ready the section entitled "Detailed Description," one will understand how the features of the embodiments described herein provide advantages over existing systems, devices, and methods relating to use of microwaves for pre-conditioning and/or excavating rock.

The following disclosure describes non-limiting examples of some embodiments. For instance, other embodiments of the disclosed device, systems and methods may or may not include the features described herein. Moreover, disclosed advantages and benefits may apply only to certain embodiments of the invention and should not be used to limit the disclosure.

Systems, devices and methods are described for a system for excavating a rock face using microwaves. The system may include a microwave generator, an articulable robotic arm with a plurality of rotatably connected rigid waveguide segments, an applicator attached to a distal end of the robotic arm, and a robotic control system. The system produces microwaves with the microwave generator and moves the robotic arm such that the applicator moves along the rock face as the microwaves exit the applicator to precondition the rock face for excavation. Various patterns of microwave treatment, and controls based on sensor feedback, may be implemented.

A first aspect of the disclosure includes a system for excavating a rock face using microwaves. The system can include a microwave generator for generating microwaves. An articulable robotic arm includes a plurality of rotatably connected waveguide segments, the waveguide segments being rigid. An applicator attaches to a distal end of the robotic arm. A control system produces microwaves with the generator that travel through the waveguide segments to the applicator. The control system can move the robotic arm such that the applicator moves along the rock face as the microwaves exit the applicator.

According to some embodiments, the applicator focus the microwaves to produce a microwave beam at the rock face. According to another embodiment, the applicator includes a tapered internal channel that reduces in width to an exit port. According to another embodiment, the control system moves the robotic arm such that the applicator moves at a scan speed along the rock face. According to another embodiment, the control system moves the applicator within a vertically oriented plane. According to another embodiment, the control system moves the robotic arm such that the applicator moves a particular direction along the rock face. According to another embodiment, the control system moves the robotic arm such that the applicator moves with a particular orientation relative to a contour of the rock face. According to another embodiment, the control system moves the robotic arm based on an amount of energy in the microwaves.

According to another embodiment, a sensor detects a microwave mining parameter, and the control system adjusts production of the microwaves and/or movement of the robotic arm based on the microwave mining parameter. According to another embodiment, the microwave mining parameter includes an amount of microwave energy generated by the generator, an amount of microwave energy exiting the applicator, an amount of microwave energy at one or more joints of the rotatably connected waveguide segments, a type of rock in the rock face, a temperature of the rock face, and/or a degradation of the rock face. According to another embodiment, the control system controls any of the following based on the mining parameter: an orientation of the applicator relative to the rock face, a direction of movement of the applicator along the rock face, and/or a speed of movement of the applicator along the rock face. According to another embodiment, the plurality of rotatably connected waveguide segments are connected at rotatable joints includes internal antennas. According to another embodiment, the internal antennas comprise a cylindrical shape. According to another aspect, the internal antennas are T-shaped.

According to a second aspect, a method for excavating a rock face using microwaves includes generating microwaves from a microwave source. The microwaves are guided along a waveguide to an articulable robotic arm that includes one or more articulable waveguide segments. One or more of the articulable waveguide segments is adjusted to position an applicator on the robotic arm relative to the rock face. The microwaves are directed through the applicator and onto the rock face.

According to some embodiments, the robotic arm is moved such that the applicator moves along the rock face as the microwaves exit the applicator. According to another embodiments, the microwaves area focused to produce a microwave beam at the rock face. According to another embodiment, the applicator includes a tapered internal channel that reduces in width to an exit port. According to another embodiment, applicator is moved at a particular speed along the rock face. According to another embodiment, the applicator is moved in a particular direction along the rock face. According to another embodiment, the applicator is orientated relative to a contour of the rock face. According to another embodiment, the robotic arm is moved based on an amount of energy in the microwaves.

According to another embodiment, a microwave mining parameter is detected. Generation of the microwaves and/or movement of the applicator can be adjusted based on the microwave mining parameter. According to another embodiment, a microwave mining parameter includes one or more of the following: an amount of microwave energy generated by the generator, an amount of microwave energy exiting the applicator, an amount of microwave energy at one or more joints of the one or more waveguide segments, a type of rock in the rock face, a temperature of the rock face, and a degradation of the rock face. According to another embodiment, an orientation of the applicator relative to the rock face, a direction of movement of the applicator along the rock face, and/or a speed of movement of the applicator along the rock face is adjusted based on the mining parameter. According to another embodiment, one or more articulable waveguide segments include a rotatably connected waveguide segments with internal antennas. According to another aspect, the internal antennas are T-shaped.

The foregoing summary is illustrative only and is not intended to be limiting. Other aspects, features, and advantages of the systems, devices, and methods and/or other subject matter described in this application will become apparent in the teachings set forth below. The summary is provided to introduce a selection of some of the concepts of this disclosure. The summary is not intended to identify key or essential features of any subject matter described herein

BRIEF DESCRIPTION OF THE DRAWINGS

Various examples are depicted in the accompanying drawings for illustrative purposes, and should in no way be interpreted as limiting the scope of the examples. Various features of different disclosed examples may be combined to form additional examples, which are part of this disclosure.

DETAILED DESCRIPTION

Figure 1:
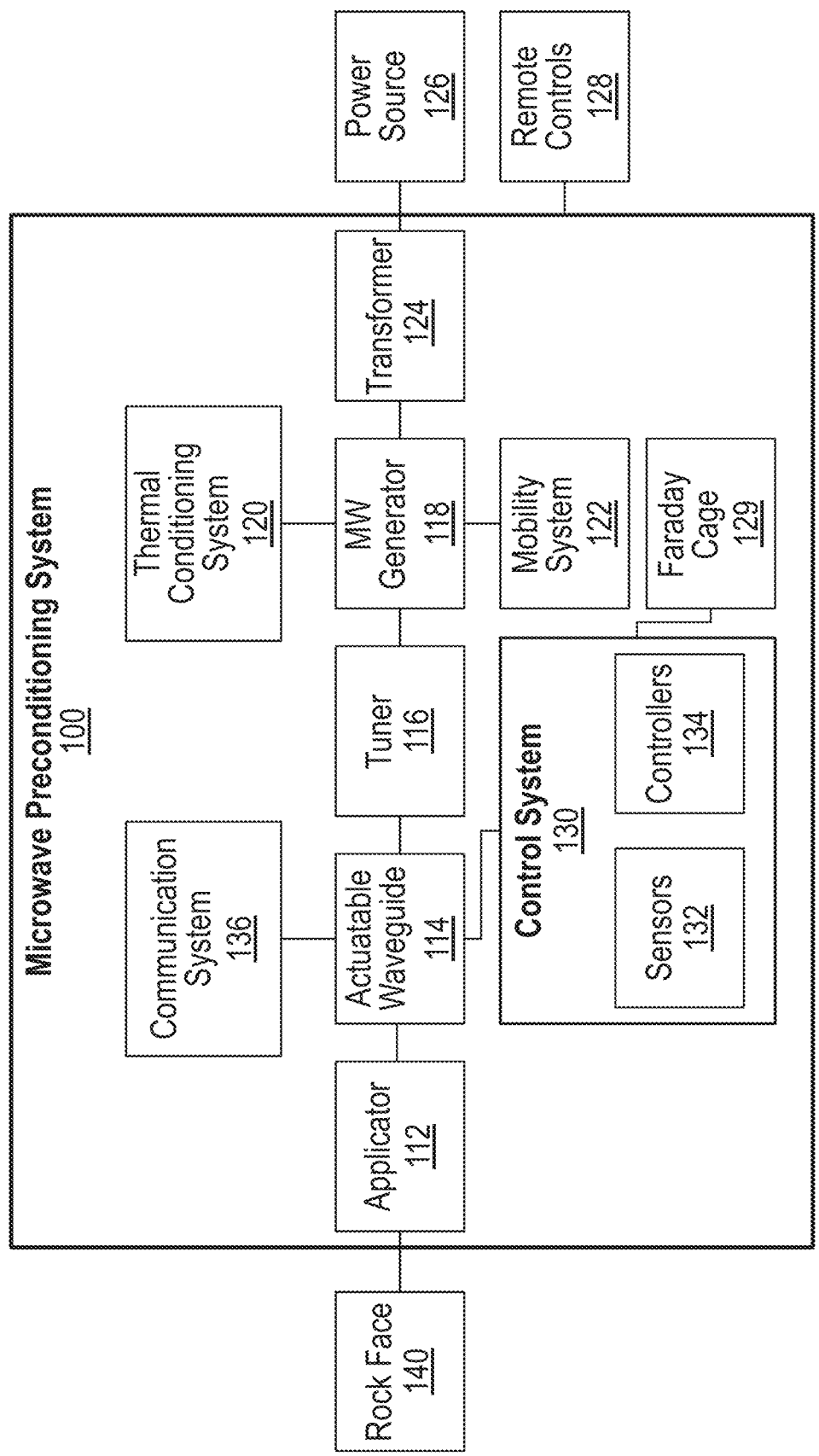
FIG. 1 shows a block diagram of an embodiment of a microwave preconditioning system that includes a microwave generator, an articulable waveguide that forms a robotic arm, an applicator, and a robotic control system for directing microwaves at a rock.

The various features and advantages of the systems, devices, and methods of the technology described herein will become more fully apparent from the following description of the examples illustrated in the figures. These examples are intended to illustrate the principles of this disclosure, and this disclosure should not be limited to merely the illustrated examples. The features of the illustrated examples may be modified, combined, removed, and/or substituted as will be apparent to those of ordinary skill in the art upon consideration of the principles disclosed herein.

Microwave-Based Excavation

There are various methods of excavating and breaking up rock or other materials (collectively "rock" herein) by putting energy into the rock to create physical movements in the rock that propagate as shockwaves. Among the historical methods is explosive blasting using chemical compounds. Blasting releases high amounts of energy (in the megawatt to gigawatt range), however, there is very little total energy that is input into the rock. Detonating small explosive charges embedded within the rock produces damage more efficiently, from an energy perspective. Thus, the biggest trouble with using explosive chemical compounds is procuring the chemical compounds and positioning them in the rock to create the desired excavation effects. Accordingly, there is a need for simpler and more effective methods of inputting high total power in a rock.

To meet this need, the systems and devices described herein relate to microwave heating of rock or microwave excavation that relies on thermally heating the rock to create micro and macro-cracking due to differential heating. For rocks to be susceptible at all to microwaves, they need to have at least one mineral constituent that is susceptible. If the mineral is evenly distributed in a large part of a massive rock, the rock will be less transparent, and more energy will be absorbed, resulting in faster heating. If the mineral is present but scarce, then the grains may heat locally, but it is less likely that their influence would be large enough to propagate cracking.

The thermal expansion of the rock caused by energy absorption in the form of heating creates stresses and strains that are sheer or tensile in nature and against which rock is generally very weak. The resulting fracture damage created by the thermal expansion reduces the overall hardness of the rock, reduces rock integrity, makes rock more easily crushable, and lowers the amount of energy required to excavate such rock.

Research into the microwave excavation or preconditioning of rock has generally been limited to laboratory studies in which a rock or sample is placed inside of a microwave-tuned closed container. Microwaves are projected into the cavity and bounce internally within the cavity until they are absorbed by the material of the rock. Thus, there is no need or requirement that the energy projected by the microwave be absorbed right away or by a first pass of the microwave at the rock. In order to make the microwave preconditioning of rock commercially viable and functional in an actual mining setting, there needs to be a way to efficiently eject energy into a rock at sufficient power levels to create the differential thermal expansion that creates the micro fracturing along grain boundaries and macro fracturing at the rock surface. This system would need to create a way for the energy of the microwaves to be absorbed immediately during the first pass at the rock before it is lost into other locations such as other system components or areas within a mining shaft. The systems and methods described herein provide such advantages, among others.

Further, the efficiency of the energy delivered to a rock wall by the microwave system also depends on impedance matching. Simply connecting a monopole antenna with a magnetron or other microwave generator will create an impedance mismatch that will diffract the microwave beam significantly. This results in incredible power inefficiencies and may prevent absorption of most of the energy by the rock. Accordingly, an impedance tuner may adjust the output impedance of the microwaves that are being delivered to the rock. The systems and methods described herein may provide for such advantages, among others.

Another factor in efficient delivery of energy to the rock is the antenna or applicator design. A correctly designed applicator may focus the microwave beam in a tight location. The combination of the applicator and the impedance tuner may be used to match the impedance and may concentrate a large fraction of the energy of the microwaves directly forward into the rock.

For macro fracturing, the depth of the absorption of the microwaves is also important. In macro fracturing, the rock is heated to a desirable depth at a temperature that is relatively high relative to the cold rock surrounding it. By heating to a sufficient depth, the thermal differential may create the macro cracking of the rock. The microwave frequency and the applicator focus area are at least two factors used to control the absorption depth of the microwave energy.

According to one technique, a wider microwave beam may be used that heats a surface disk at a shallow depth. The surface disc may spall off with a sheer crack forming underneath the surface disc. Alternatively according to another technique, a narrow beam may be used to create a high heat differential with cold rock surrounding the narrow beam.

With macro fracturing, it is desirable to get as much energy into the rock within a depth range as quickly as possible. In experiments, it was found that as the frequency of the microwaves get higher, the penetration depth lower. Likewise, it was found that as the frequency of the microwaves get higher, the area of penetration (e.g., radial area) gets narrower. Microwaves in the 1.25 gigahertz (GHz) range were penetrating meaningfully to a depth of 30 centimeters with a width of approximately 12 centimeters. Microwaves in the 2.45 GHz range were penetrating to a depth of 10 centimeters with a radius of approximately 6 centimeters. Microwaves in the 5.8 GHz range were penetrating to a depth of 5 centimeters with a radius of approximately 3 centimeters. Microwaves in the 22 GHz range were penetrating to a depth of 1.5 centimeters with a radius of approximately 1 centimeter. It was observed that heating to the depth of about 3 to 8 centimeters, or 6 to 8 centimeters, or 6 to 7 centimeters may create an ideal cylinder that induces radial cracks in the surrounding material. It was also observed that the penetration depth may also become shallower as more energy is absorbed by the surface (temperature increases). The systems and methods according to the present disclosure allow for achievement of such outcomes, among others.

The control system according to the present disclosure may be programmed in a variety of ways, and the articulable robotic arm made of waveguide segments may be configured in particular ways, to achieve a desired outcome. The position and location of the applicator may be determined by the surface relief and orientation of the rock face. The direction of movement of the applicator may be determined by the preferred scanning pattern. The applicator may be moved in a raster scan or create a regular pattern, (e.g., checkerboard pattern, a dot pattern resulting from 'painting' the surface by applying energy unevenly, or a random pattern). In certain implementations, the pattern may be an intelligent pattern. In the intelligent pattern, the energy may be applied based on how the material responds. The robotic arm may be formed of a plurality of rigid waveguide segments that allow for minimal loss of signal, with maximum flexibility in the mobility of the arm and thus location of the applicator.

The cumulative transmitted energy delivered to a rock face depends on the power level and time of application. The power may be varied for a fixed time of application or the time may be varied for a fixed power to deliver the same cumulative energy. Each may be varied at different locations. The result may be an uneven distribution of energy or an even distribution, whichever is determined to have more effect, for example based on the properties of the rock being excavated. The cumulative energy delivered may be based on predictive modelling (e.g., open loop control, reactive control, or closed loop control based on feedback from sensors). For example, infrared sensors may be used to see how the energy is being absorbed based on temperature. In another example, acoustic sensors may be used to track how the material is responding to the application of energy. Materials crack and sound differently as energy is pumped into them. In another example, the radar return signal may be used to track how the material is responding to the application of energy. A heterogeneous or an-isotropic material will respond differently to the same energy levels. Radar echoes may show how the material is responding internally and the application of energy may be modified in real time based on the detected changes. The articulable waveguide segments of the robotic arm and other features described herein allow for achieving a desired power level and time of application in order to deliver a desired cumulative energy to the rock.

The amount of energy being transmitted down the waveguide of the robotic arm may be measured in real time. This energy may include that energy being emitted from the microwave generator and that energy passing through the applicator into the rock. The waveguide may include one or more sensors to measure the energy going down a waveguide in both directions. Microwave generators also have internal methods to measure and control their power independent of the waveguide. This allows one to measure both transmitted and reflected power, as well as power leaking into the environment. Each segment of the articulable waveguide may include sensors used to determine the energy going through each node and the environment inside the waveguides, e.g. humidity, temperature, arcing, etc.). In certain implementations, the articulable arm may transfer 100 kilowatts (kW) of microwave power to rock with less than 50 Watts (W) of loss or 0.05% inefficiency at 915 Megahertz (MHz). Both higher and lower power transfer levels are possible.

Microwave Preconditioning System Architectures

FIG. 1 is a block diagram of an embodiment of a microwave preconditioning system 100 for excavating a rock face 140. The rock face 140 may be located underground, (e.g., within a tunnel), above ground, or in any location. In one implementation, the rock face 140 may be oriented generally vertically relative to the system 100. Alternatively, the rock face 140 may be located in any orientation relative to the system 100 (e.g., on one or more sides of the system 100, horizontally above, below or at any location therebetween, including tunnels). The rock face 140 may include smooth, coarse and/or jagged features. The rock face 140 may comprise a homogenous or heterogeneous material. One or more of the mineral components of the rock face 140 may be susceptible to heating through the absorption of radiation within the microwave range.

The system 100 may convert energy from a power source 126 into microwaves that are directed at the rock face 140. As described above, the energy absorbed by the rock face 140 may lead to thermal fracturing of the rock face 140 and consequent weakening of the rock face against mechanical excavation. The power source 126 may include electrical energy from a grid connection, generator (e.g., fossil fuels), renewable energy source (e.g., solar or wind), battery, fuel cell, nuclear reactor, or other type of energy source. The power source 126 may be fully integrated within the system 100, such as through the use of batteries or a nuclear reactor. The power source 126 may be fully external to the system 100, such as a grid or generator connection. The connection of the power source 126 with the system 100 may be continuous based on the availability of the energy source. The connection of the power source 126 with the system 100 may be intermittent based on the availability of an exhaustible energy source.

The system 100 may be fully user-controlled either internally (e.g., by a human within a Faraday cage 129) or externally using a remote control system 128. The remote control system 128 may be connected with the system 100 through a wired or wireless connection (e.g., RF). The user control systems may be used in conjunction with one or more autonomous functionalities of the system 100, as described further below. The user control system can include one or more networked computer systems.

The system 100 may include various components for converting energy from the power source 126 to produce and deliver microwaves to the rock face 140. Any or all of the following components may be used within the system 100. Additionally, other components not described herein may be used in lieu of or in addition to these components.

The energy delivered by the power source 126 may be received through a transformer 124. The transformer 124 may convert the electrical energy from the power source into a suitable format (e.g., voltage, amperage, and/or waveform) for use by the system 100. The transformer 124 may produce the high voltages needed to operate a magnetron or other type of microwave generator requiring low voltages. Additionally, one or more filters, such as a total harmonic distortion filter may be used in conjunction with the transformer 124. The transformer 124 can be used in conjunction with a power meter. The power meter can measure electrical parameters such as voltage, current, energy values, frequency, power factors, and/or asymmetry of the multi-phase power supply.

The system 100 may include a microwave generator 118 for generating radiation within the microwave frequency spectrum (300 MHz and 300 GHz) from the energy delivered thereto from the power source. The microwave generator 118 may be connected with the power source 126 through the transformer 124. The microwave generator 118 may include a magnetron, solid-state microwave generator, a klystron device, or other type of generator.

The microwave generator 118 may be selected based on the desired microwave output. The desired microwave output may be based on the mineral contents of the rock face 140. The microwave generator 118 may have a microwave output between 915 MHz and 22 GHz. In certain examples, the microwave generator 118 may have a microwave output of 915 MHz, 922 MHz, 2.45 GHz, 5.8 GHz, or 22 GHz.

The power output of the microwave generator 118 may be measured either continuously or pulsed (e.g., power output maximums). The microwave generator 118 may have a continuous power output between 50 kW and 1 MW. The microwave generator 118 may have a maximum pulsed power output between 100 kW and 1 GW. The microwave generator 118 can include a plurality of sensors for monitoring various aspects of itself. The sensors can include voltage and/or current sensors, filament monitoring, temperature monitoring, thermal conditioning system monitoring (e.g., water or air temperature, circulation, pressure, electromagnet/isolator water flow monitor, etc.), power supply monitoring, open doors or latch, remote switching of EMF, etc.

Operation of the microwave generator 118 may also produce a significant amount of heat in operation, due to power efficiency losses. To maintain efficiency, the microwave generator 118 may be used in conjunction with a thermal conditioning system 120. The thermal conditioning system 120 may comprise a chiller that may operate to reduce a temperature of the microwave generator. The thermal conditioning system 120 may comprise radiation fins, water cooling (or other kinds of liquid cooling), Peltier cooling, or other techniques for reducing temperature of the microwave generator 118.

The microwave generator 118 may be used in conjunction with a tuner 116. The tuner 116 may be an impedance tuner for matching the impedance of the delivery conduits of the microwave preconditioning system 100 to a rock 140. Impedance tuning may vary the load impedance of the microwave generator 118 to match the rock face 140. The tuner 116 may be an active (e.g., automated) or passive tuner. The tuner 116 may be connected directly with an output of the microwave generator 118 or within a waveguide or coaxial cable.

The microwave generator 118 may output microwaves through a waveguide. The waveguide may be a rigid or flexible waveguide. The output waveguide may be a fixed waveguide that is fixed with a frame of the system 100. The tuner 116 may be located on, before, or after the output waveguide.

The output waveguide may be connected with an articulable waveguide 114. The articulable waveguide 114 may comprise a plurality of rigid waveguide segments connected together at one or more joints. The rigid waveguide segments may be rectangular in cross section. The rigid waveguide segments and joints may guide the microwaves from the microwave generator 118 from a proximal end to a distal end. The articulable waveguide 114, including the segment and joints, may be designed to lessen energy losses of the microwaves during passage therethrough. Alternatively to the plurality of rigid waveguide segments, the articulable waveguide 114 may comprise a flexible waveguide or both flexible and rigid waveguide components. The flexible waveguide can extend from a proximal end to a distal end. Alternatively, to the articulable waveguide 114, the microwave generator 118 may output microwaves through a coaxial cable.

The distal end of the articulable waveguide 114 may include an applicator 112. The applicator 112 may be attached with the distal end of the articulable waveguide 214. The applicator 112 may be attached with the distal end by a wrist joint. The wrist joint may be actuatable by the control system 130. The applicator 112 may be an antenna for focusing the microwave energy at the rock 140. The applicator 112 may be a horn, inverse horn, parabolic, or other type of antenna. The applicator 112 may include proximal end that tapers to a smaller distal end (e.g., in a pyramidal or conical shape).

The applicator 112 may include a tapered internal channel that reduces in width to an exit port (e.g., aperture). The distal end and/or the proximal end may be rectangular in cross section. The distal end may include a plate. The plate may include an aperture. The aperture may be rectangular and/or centered on the plate. The aperture may be an open space or comprise a microwave transparent material. The aperture size may be selected to focus the microwaves into a beam. The plate may include one or more flanges extending about an outer periphery of the distal end of the applicator 112. The applicator 112 may apply large amounts of energy very quickly to precise locations where it is needed to precondition or alter the rock face in some way. Precision application, rather than blanket irradiation is desirable (e.g., to selectively create differential thermal fracturing).

The plurality of rigid waveguide segments and corresponding joints may enable movement and positioning of the distal end of the waveguide 114 and applicator 112 within a range. The range may be a two-dimensional (e.g., X and Y-directions) or three-dimensional space (e.g., X, Y, and Z-directions). The articulable waveguide 114 may also move and position an orientation of the applicator 112. The orientation of the applicator 112 may include a direction in which the microwaves are directed. The position of the applicator 112 may include an X, Y, and/or Z location and/or an orientation (e.g., azimuth and altitude angles).

The waveguide 114 may be robotically controlled to move the distal end and applicator 112 within the range and adjust the orientation of the applicator 112. The waveguide 114 may be robotically controlled by a control system 130. The control system 130 may be based on kinematic controls, force sensors, position sensors, and/or other methods. The control system 130 may include joint controllers 134 for moving the plurality of segments about the respective joints of the waveguide 114. The joint controllers 134 may take various forms including servos, stepper motors, electromechanical, hydraulic, electro thermal or other motor types. The joint controllers 134 may include one or more positional feedback devices (e.g., encoders) for tracking positions of the waveguide 114. The control system 130 may be operable to position a distal end of the waveguide 114 and support the plurality of waveguide segments. Desirably, the robotic control system is on the outside of the waveguides, and the electromagnetic microwave energy is on the inside of the waveguide such that one does not interfere with the other. The control system 130 can include a collision detection system. The collision detection system can prevent collisions of the robotic arm with other components of the system 100 and/or external features, such as the rock wall 140. The collision detection system can be based on kinematic models of the robotic arm, video surveillance, one or more limit switches and/or other sensors. The limit switches can effect a hard stop for the robotic arm in the event of any limit system being triggered.

The control system 130 may include a plurality of sensors 132. The sensors 132 may enable monitoring various aspects of the system 100 including the position of the articulable waveguide 114 and/or orientation of the applicator 112. The sensors 132 may interact with the environment of the microwave preconditioning system 100 and the rock 140 to provide feedback for operation of the system 100 based on one or more mining parameters. The mining parameters detected by the sensors 132 may be used to control the articulable waveguide 114 and/or the applicator 112 or other aspects of the preconditioning system 100 such as the microwave generator 118.

The sensors 132 may include distance sensors. The sensors may include a plurality of different types of sensors. The sensors may be spaced about the articulable waveguide 114 and/or applicator 112. In one example, distance sensors may be mounted on the applicator 112. The distance sensors may be used to positioned the applicator a distance from the rock wall 140. The distance sensors may enable the microwaves to be focused on the rock wall 140. The distance sensors may include ultrasonic, infrared, LIDAR, laser, LED, or other types of sensors.

The sensors 132 may include acoustic sensors. The acoustic sensors may detect cracking of the rock wall 140 during application of the microwaves. The cracking may indicate the effectiveness of the microwave treatment. Audible and visual indications of cracking both at the surface and within are possible. The system may accordingly include an algorithm looking for and listening for these indicators. Additionally, ground penetrating radar may be used for both real time and post degradation determination.

The sensors 132 may include thermal sensors. The thermal sensors may detect a temperature of any of various components of the system 100. The thermal sensors may monitor the rock wall 140 during microwave treatment, the temperatures of the applicator 112, the articulable waveguide 114, the microwave generator 118, the thermal conditioning system 120, the transformer 124, and/or other components. The thermal sensors may be infrared sensors, laser sensors, thermocouples, FLIR thermal camera, temperature probes (e.g., into the rock face 140) or other types of sensors. Rock electromagnetic characteristics also change with temperature, therefore energy transmission and reflection measurements may be used to measure temperature. The control system 130 can monitor the temperature of the rock face 140 at one or more location with the sensors 132. The control system 130 can also simulate the temperature of the rock. The temperature simulations can be based on the amount of microwave energy delivered to the rock face, the type of materials in the rock face, and/or the position and/or orientation of the applicator 112 to the rock face 140, or other details of the system 100 etc. The temperature of the rock face (real or simulated) can be used to correlate with rock weakening. The differences between the real and simulated temperatures can be used to detect variations in rock composition.

The sensors 132 may include still and/or video cameras. The cameras may monitor the rock wall 140. The cameras may detect and/or measure visible cracking or other degradation of the rock wall 140 due to treatment with microwaves. The video surveillance can be used to control the robotic arm when not visible to an operator.

The sensors 132 may include topography mapping equipment for the rock wall 140. The contours of the rock wall may be mapped using the sensors 132. The topography mapping equipment may include machine vision, LIDAR, radar, the distance sensors and/or other sensors. The topography mapping equipment may facilitate autonomous operation of the system 100. The system 100 may precondition the rock wall 140 based on the measured topography. The system 100 may include operational algorithm that take advantage of features the measure topography of the rock wall 140 to speed up preconditioning and/or improve energy efficiency.

The sensors 132 can include environmental sensors. The sensors 132 can include a methane detection sensor. The methane detection sensor can warn an operator (e.g., lights, sirens) and/or stop the system 100 from generator microwave energy. The sensors 132 can include a fire detection system. The system 100 can include a fire suppressant (e.g., gas or powder). The fire suppressant can be released automatically or manually. The sensors 132 can include a microwave energy detector. The microwave energy detector can be used to monitor reflection of the microwaves off of the rock face 140 onto the system 100 or elsewhere. The sensors 132 can include an incline sensor. The incline sensor can function to measure levelness of one or more components of the system 100. One or more platforms of the system 100 can include actuatable feet or wheels. The feet or wheels can be adjustable to level the system 100.

The system 100 may include a mobility system 122. The mobility system 122 may be self-moving. The mobility system 122 may include a wheeled or tracked system. Alternatively, the mobility system 122 may require an external force such as another vehicle (e.g., truck, tractor or crane crane) that lifts one or more units that comprise the system 100. Examples of suitable mobility systems are described in U.S. Pat. Pub. No. 2021/0114219 titled "Systems and Methods for Industrial Robotics" and published Apr. 22, 2019, and in U.S. Pat. Pub. No. 2021/0116889 titled "Industrial Robotic Platforms" and published on Apr. 22, 2021, the entireties of each of which is hereby incorporated by reference and forms a part of this specification for all purposes.

The microwave preconditioning system 100 may include a communication system 136. The communication system 136 may transmit data from the system 100 to a remote server such as a control server or the remote control 128. The remote control 128 may be operated by a human or a computer-controlled system. The communication system 136 may be via a wired or wireless connection. The communication system 136 may communicate the mining parameters, position/orientation of the applicator 112, position of the articulable waveguide 114, other data from the sensors 132, data from the microwave generator 118, thermal conditioning system 120, the mobility system 122, or other data.

Figure 2:
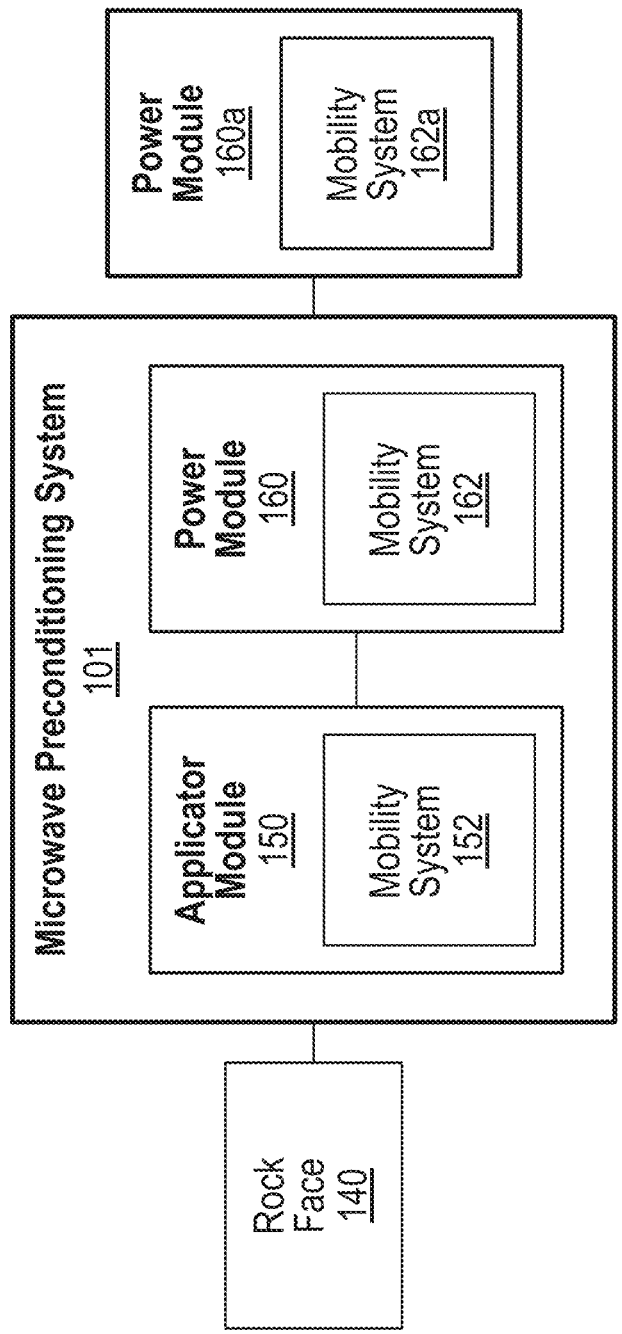
FIG. 2 shows a block diagram of another embodiment of a microwave preconditioning system including an applicator module and a power module, each with its own independent mobility system. The power module may be one of a plurality of power modules, each connectable with and/or separable from the applicator module.

FIG. 2 is a block diagram showing an embodiment of a microwave preconditioning system 101. The microwave preconditioning system 101 may be used with, or include any of the components of, the microwave preconditioning system 100 as described above. The microwave preconditioning system 101 includes a plurality of modules containing the components. The system 101 may include an applicator module 150. The applicator module 150 may include the microwave generator 118, thermal conditioning system 120, articulable waveguide 114, applicator 112, and control system 130.

The microwave preconditioning system 101 may include a power module 160. The power module 160 may include the power source 126. The energy of the power source 126 may be in the form of a battery or other portable energy source. The applicator module 150 may include a mobility system 152, like the mobility system 122. The power module 160 may include a mobility system 162, like the mobility system 122. The applicator module 150 may be independently maneuverable from the power module 160. Likewise, the power module 160 may be independently maneuverable from the applicator module 150. In use, the applicator module 150 may be coupled with the power module 160 via a power connection. The power connection may include a cable or other connector to transfer energy from the power source 126 to the applicator module 150.

As the energy from the power source 126 wanes or is used up, the power module 160 may be disconnected from the applicator module 150. The mobility system 162 may transport the power module 160 away from the applicator module 150 The power module 160 may return to a refueling or recharging station. In place of the power module 160, a secondary power module 160a may connect with the applicator module 150. The secondary power module 160 may have the same components as the power module 160. The secondary power module 160a may include a mobility system 162a. The mobility system 162a may position the secondary power module 160a with relation to the applicator module 150 and the power connection may be coupled for transferring power from the secondary power module 160a to the applicator module 150. Additional secondary power modules 160a may also be used to supply energy to the applicator module 150.

The applicator module 150 and the power module 160 may be implemented in the form of independent bots such as the swarm robots described in U.S. Pat. Pub. No. 2021/0114219 titled "Systems and Methods for Industrial Robotics" and published Apr. 22, 2019, and in U.S. Pat. Pub. No. 2021/0116889 titled "Industrial Robotic Platforms" and published on Apr. 22, 2021, the entireties of each of which is hereby incorporated by reference and forms a part of this specification for all purposes. In other implementations, one or more of the power modules 160a may be movable and/or connectable with the applicator module 150 by a human operator.

Figure 3:
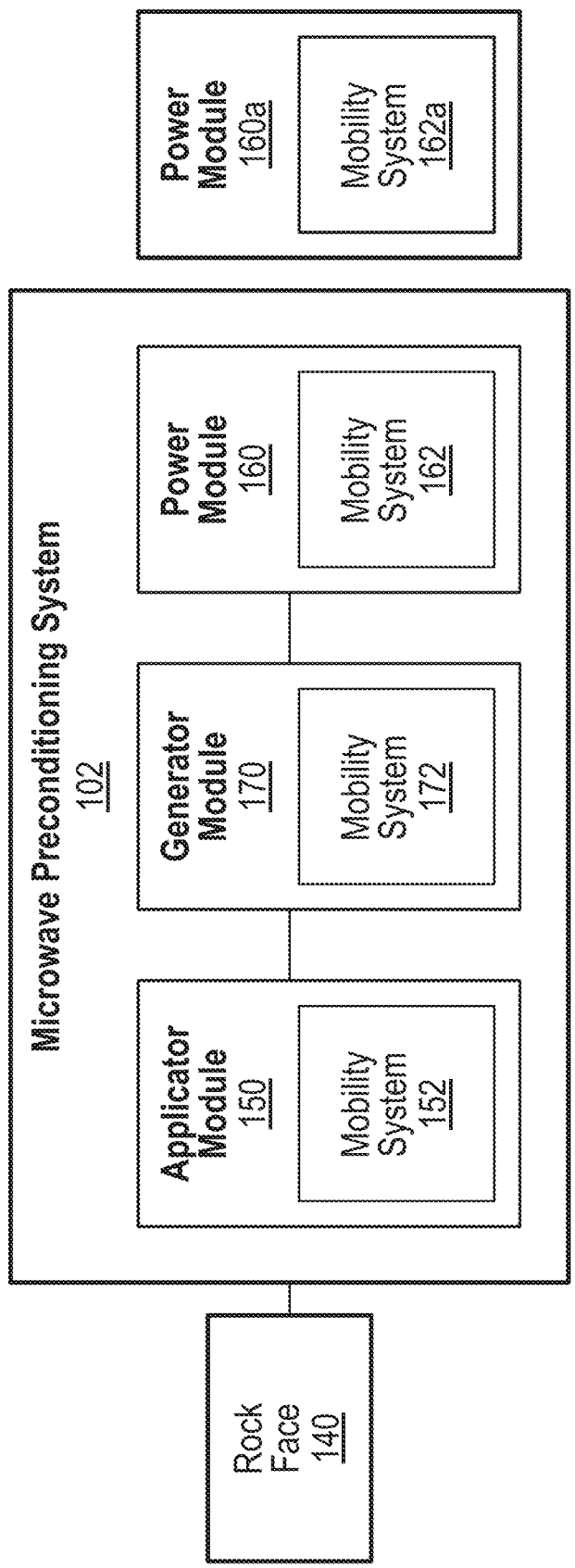
FIG. 3 shows a block diagram of another embodiment of a microwave preconditioning system including an applicator module, a generator module, and a power module, each with its own independent mobility system. The microwave generator, the articulable waveguide, the applicator, the robotic control system, or other operable components of the microwave preconditioning system of FIG. 1 may be distributed between the applicator module, the generator module, and the power module (and/or other system modules).

FIG. 3 is a block diagram showing another embodiment of a microwave preconditioning system 102. The microwave preconditioning system 102 may be used with, or include any of the components of, the systems 100, 101 described above. The components of the microwave preconditioning system 102 may be distributed over additional modules. The system 102 may include an applicator module 150 including the mobility system 152. The applicator module 150 may include the articulable waveguide 114 and the applicator 112 as well as the control system 130. A generator module 170 may include a mobility system 172. The generator module 170 may include the microwave generator 118, the thermal conditioning system 120, and/or the transformer 124. Alternatively, the microwave generator 118 and the thermal conditioning system 120 may be combined with the applicator module 150. The generator module 170 may be connected with the applicator module 150 via one or more cables and/or waveguides. The applicator module 150 may be permanently or semi-permanently connected with the generator module 170, the mechanical connecting bar, or link. The applicator module 150 and the generator module 170 may act as a single operable unit when linked together.

The power module 160 may include the mobility system 162. The power module 160, as described above, may include the power source 126. Other module configurations are also possible. The power module 160 may connect with the generator module 170. As described above, the power module 160 may be disconnected from the generator module 170 (e.g., for replacement and/or recharging).

Although this has been described in terms of three modules, including the components of the microwave preconditioning system 100, there are other optional distributions of the components of the microwave preconditioning systems across fewer or more modules that include independent mobility systems.

Microwave Preconditioning Systems with Robotic Arm Waveguide

Figure 4A:
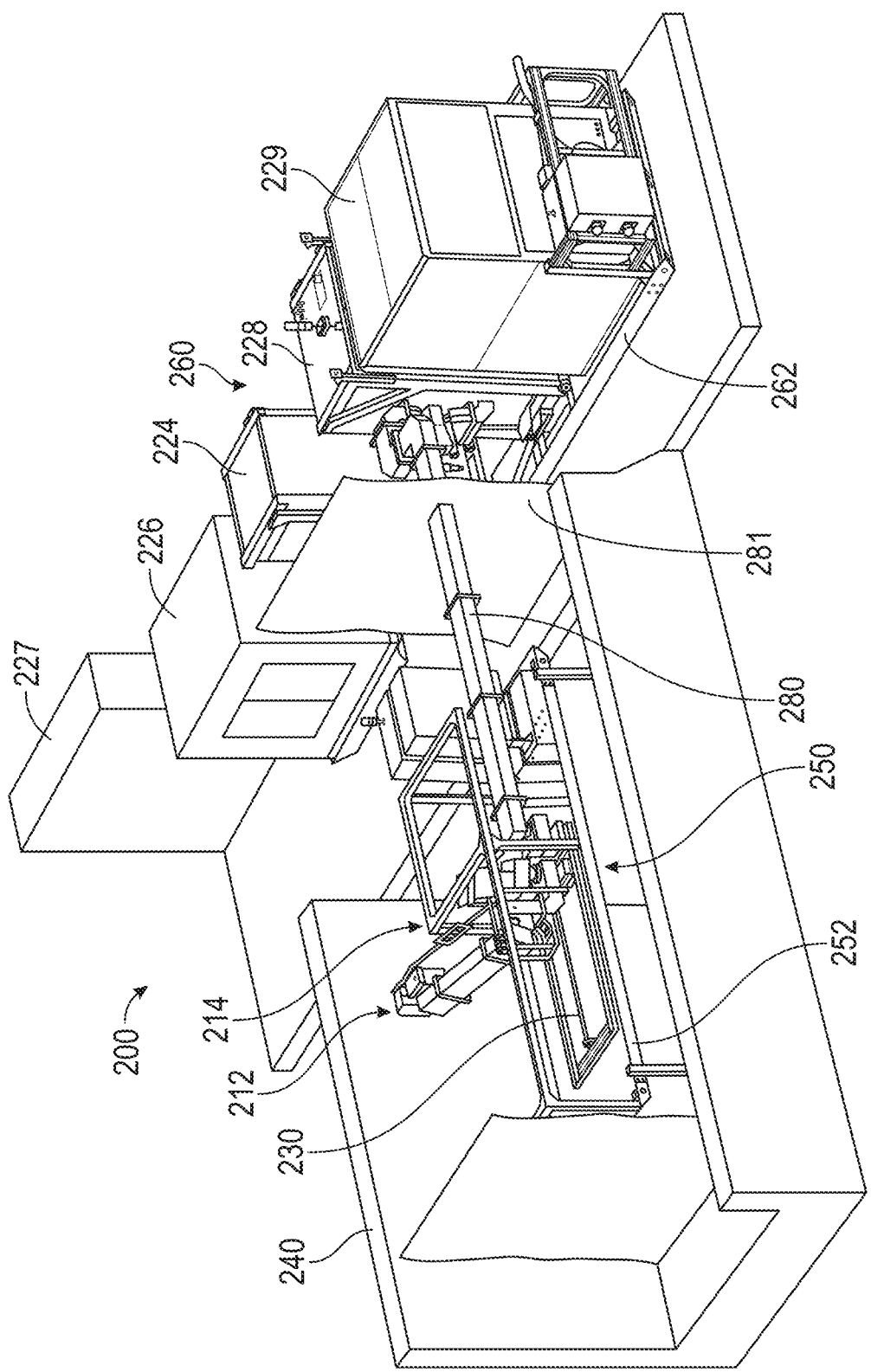
FIG. 4A is a perspective view of another embodiment of a microwave preconditioning system including a microwave generator module and a microwave applicator module having a robotic arm formed of an articulable waveguide.
Figure 4B:
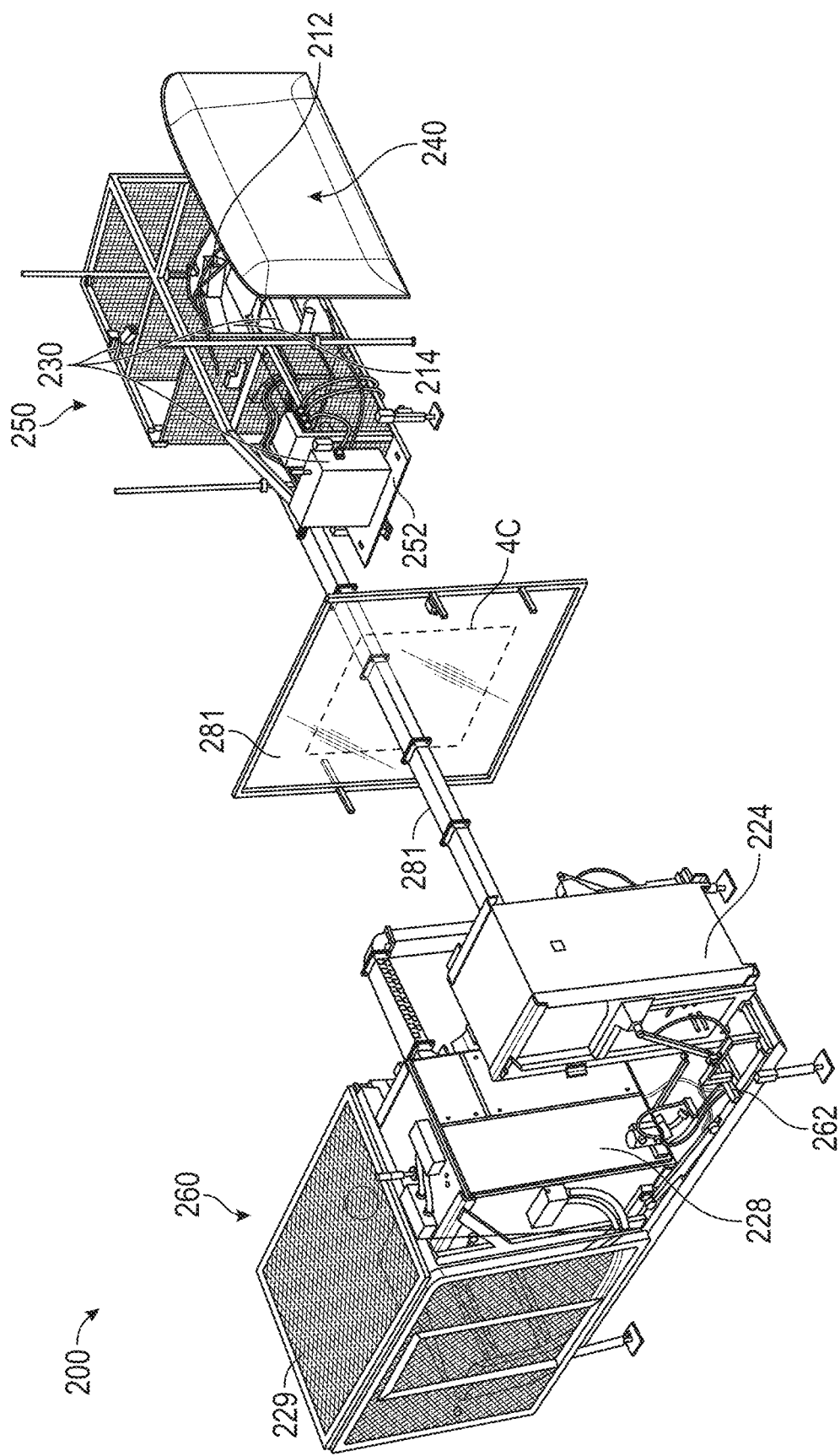
FIG. 4B is a rear perspective view of the microwave preconditioning system of FIG. 4A.

FIGS. 4A-4B are perspective views of various embodiments of a microwave preconditioning system 200. The system 200 may include any or all of the components described above in the systems 100, 101, or 102. The system 200 may include an applicator module 250 for delivering microwaves to a rock wall 240. The applicator module 250 may include an applicator 212, an articulable waveguide 214, a robotic control system 230, and/or a platform 252. The applicator 212 may be connected with a distal end of the articulable waveguide 214. The articulable waveguide 214 may be mounted on the robotic control system 230. A proximal end of the articulable waveguide 214 may be coupled with a connection waveguide 280, which may be stationary. The articulable waveguide 214 may include a plurality of rigid waveguide segments rotatably attached together to form a robotic arm that is controlled to achieve a desired mining outcome, such as energy absorption into the rock, rock degradation, energy pattern, etc. The articulable waveguide 214 and the robotic control system 230 may be mounted on the platform 252. The platform 252 may include foldable legs for transporting the platform 252 in a compact configuration. The applicator module 250 may be fully or partially enclosed by a Faraday cage 282.

The system 200 may include a generator module 260. The generator module 260 may be coupled with a power module, such as a grid. The generator module 260 may include a filter bank 227, a transformer 226, a microwave generator 228, a cooling module 224, a control room 229, and/or a platform 262. The filter bank 227, transformer 226, microwave generator 228, cooling module 224, and control room 229 may be mounted on the platform 262. The connection waveguide 280 may connect with the microwave generator 228. An impedance tuner may be connected with the connection waveguide 280. One or more faraday cages 281 may shield the control room 229. The generator module 260 and/or applicator module 250 can include a monitoring system. The monitoring system can include one or more video monitors. The monitoring system can be accessible from a remote location. The monitoring system can include a perimeter detection system that detects unauthorized persons within a prohibited area or during a prohibited timeframe. The perimeter detection system can be based on light (e.g., breaking a beam), motion, heat or otherwise based. The perimeter detection system can prevent production of microwave energy while a person is detected. The applicator module 250 can include EMF level detectors to ensure that leaks are within guidelines.

Figure 4C:
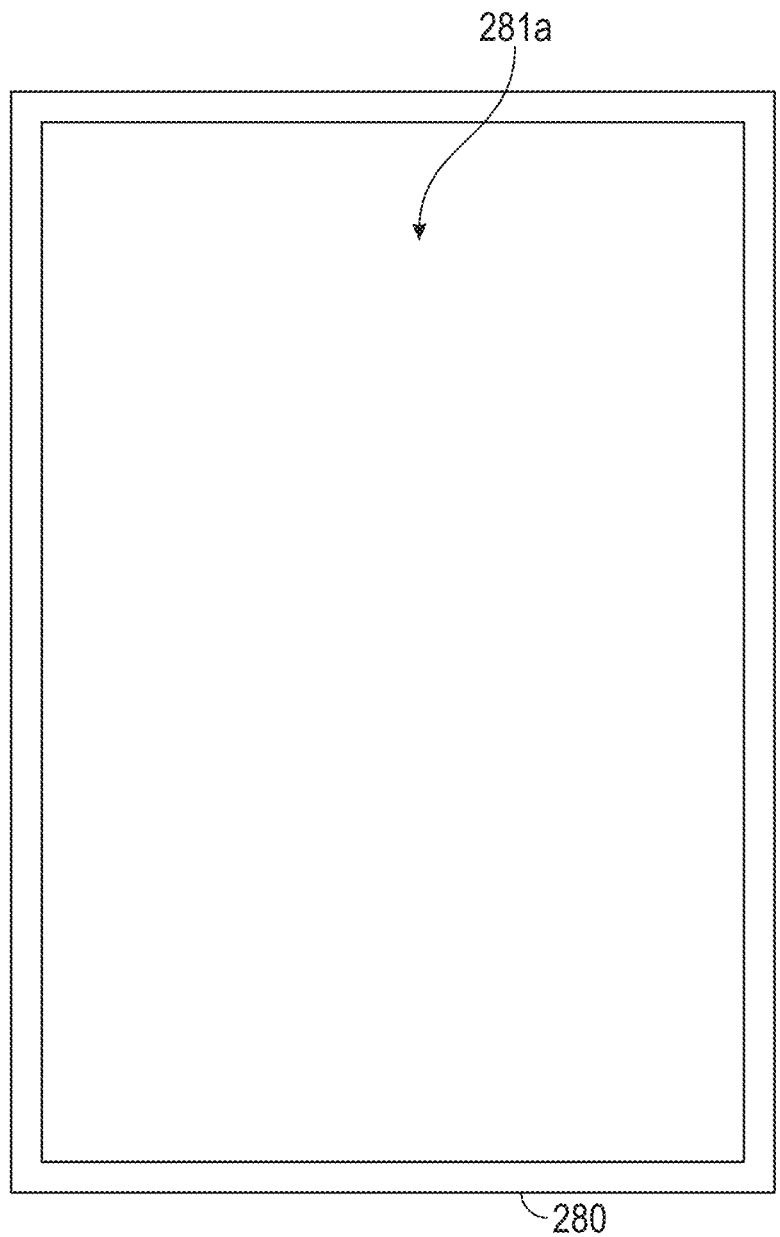
FIG. 4C is a cross-section view of the waveguide in FIG. 4B taken in the plane 4C.

FIG. 4C shows a cross section of a segment of the connection waveguide 280. The waveguide 280 may include a plurality of segments coupled together between the applicator module 250 and the generator module 260. The segments can be linear, curved or other form factors. Each end of each of the plurality of segments can include an attachment flange for abutting and joining with an attachment flange of a proximate segment. The body of the waveguide 280 can comprise a metal or other material. The body can comprise a microwave opaque material. The body of the waveguide 280 can have a substantially uniform (i.e. end-to-end) profile. The uniform profile can have a rectangular shape. One or more of the rotatable, rigid waveguide segments of the articulable waveguide 214 may have the same or similar properties as the cross-section of the waveguide 280. Thus, the segments of the articulable waveguide 214 may be rigid, have a rectangular cross-section, form a rectangular inner channel for guiding the microwaves, etc.

Figure 5:
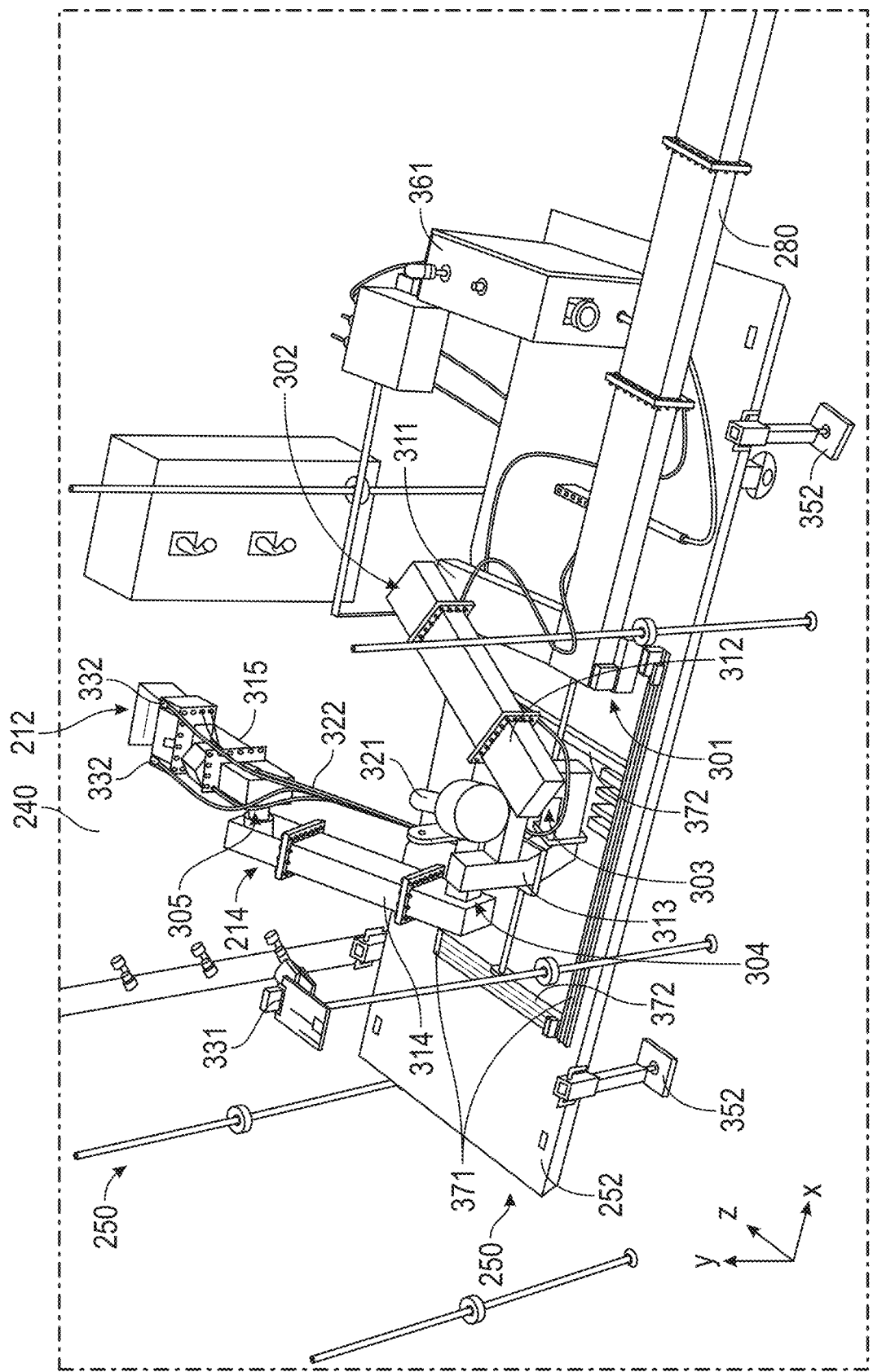
FIG. 5 shows a rear perspective view of the microwave applicator unit of the microwave preconditioning system of FIGS. 4A-4B including an articulable waveguide, an applicator, and a robotic control system.
Figure 6:
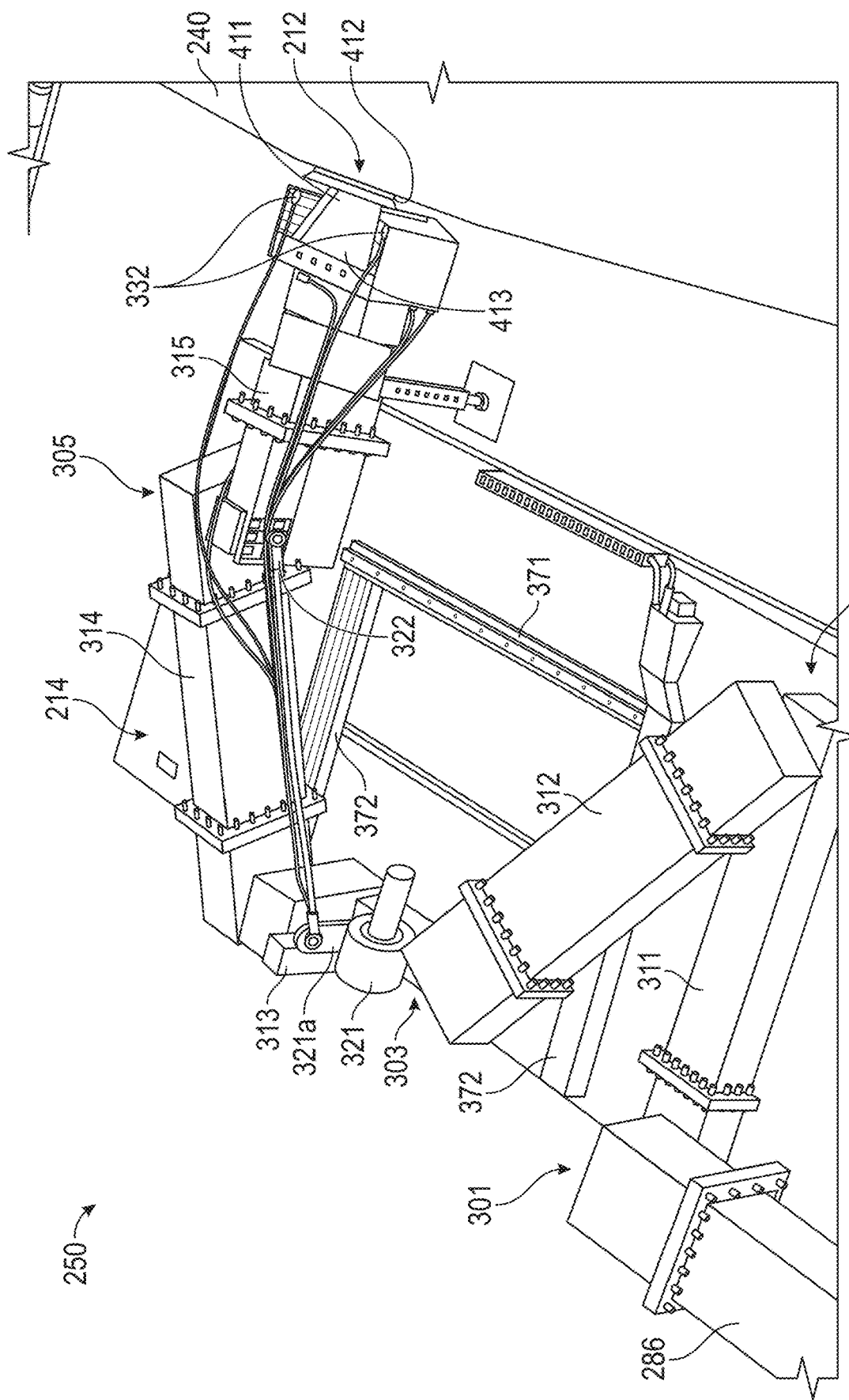
FIG. 6 shows a top perspective view of the microwave applicator unit of the microwave preconditioning system of FIGS. 4A-4B.

FIGS. 5-6 are close-up views of the applicator module 250. An X-Y-Z Cartesian coordinate system is shown in FIG. 5 for sake of description only. The Z-direction may be generally toward the rock, and the Y-direction maybe generally upward opposing the direction of gravity. The articulable waveguide 214 may comprise rigid waveguide segments 311, 312, 313, 314, and 315. Each of the waveguide segments may comprise a waveguide having a rectangular cross section. An internal channel defined by the waveguide segments, for example by inner surfaces of the sidewalls of the segments, may be rectangular. The first, second, fourth and fifth waveguide segments 311-315 may be linear. The third waveguide segment may be segmented upwardly in the Y-direction, for example with a first linear portion, an angled elbow portion, and a second linear portion.

There may be any number of the rigid waveguide segments that form the robotic arm of the articulable waveguide 214. There may be one, two, three, four, five, six, seven, eight, nine, ten or more of the rotatable rigid waveguide segments, and with the corresponding number of rotatable joints. In some embodiments, there are at least three rotatable joints with rotation axes along three mutually perpendicular directions. The articulable waveguide 214 may be configured to translate in at least three mutually orthogonal directions. Thus, the waveguide system may allow for six degrees of freedom. Such flexibility with a rigid waveguide may allow for efficiently achieving the desired mining outcomes described herein.

Adjacent waveguide segments may be rotatably coupled together at a respective rotation joint. Each of the waveguide segments may be bolted with the rotatable joints about outer peripheral flanges. The first waveguide segment 311 may be connected with the connection waveguide 280 at a first rotation joint 301. The first waveguide segment 311 can be a proximal waveguide segment. The rotation axis of the first rotation joint 301 may be oriented in the Y-direction. The first waveguide segment 311 may be connected with the second waveguide segment 312 at a second rotation joint 302. The rotation axis of the second rotation joint 302 may be oriented in the Y-direction. The second waveguide segment 312 may be connected with the third waveguide segment 313 at a third rotation joint 303. The rotation axis of the third rotation joint 303 may be oriented in the Y-direction. The third waveguide segment 313 may be connected with the fourth waveguide segment 314 at a fourth rotation joint 304. The rotation axis of the fourth rotation joint 304 may be oriented in the X-direction. The fourth waveguide segment 314 may be connected with the fifth waveguide segment 315 at a fifth rotation joint 305. The rotation axis of the fifth rotation joint 305 may be oriented in the X-direction (e.g., as a wrist joint). The applicator 212 may be mounted at the end of the fifth waveguide segment 315.

The platform 252 may include foldable, retractable or removable legs 352. A power switch 361 may be included to allow emergency power shutoff. The waveguide segments of the articulable waveguide 214 may be movably mounted on two pairs of rails 371, 372 of the robotic control system 230. The rails 371, 372 may be mounted on the platform 252. The first pair of rails 371 may be oriented along an X-direction. The second pair of rails 372 may be oriented along a Z-direction. The second pair of rails 372 may be mounted on the first pair of rails 371. Stepper motors and/or a belt or gears engaged with the rails 371, 372 may move the waveguide segments along in the X and Z-directions. The first rotation joint 301 may be mounted rigidly relative to the platform 252. The third waveguide segment 313 may be mounted on a base attached with the second pair of rails 372 and the first and second waveguide segments 311, 312 may be extendable (about the rotation joints 301, 302, 303) as the base is moved along the rails 371, 372. Alternatively, a single rail in each direction may be used.

The articulable waveguide 214 may include an actuator 321 connected with a control rod 322. The actuator 321 may be mounted on the third waveguide segment 313. The control rod 322 may be connected with the fifth waveguide segment 315. The control rod 322 may be mounted at a location spaced from the axis of the fifth rotation joint 305. Actuation of the control rod 322 by the actuator 321 may lift the fifth waveguide segment 315 and the applicator in the Y-direction. The robotic control system 230 may adjust an orientation of the applicator 212 (e.g., azimuth and altitude) and a position of the applicator 212 (e.g., in the X, Y, and Z-directions). A gearbox can be coupled with the fourth joint 304. The gearbox can provide control of the fourth segment 314 about the fourth joint 304.

The applicator 212 may include various sensors of the robotic control system 230. The sensors may include distance sensors 332. The distance sensors may be mounted on the applicator 212. The distance sensors 332 may be mounted on one or more corners of the applicator 212 (e.g., on all four corners). The distance sensor 332 can provide continuous measurement of a distance between the applicator 212 and the rock face 240. The distance sensors 332 can facilitate focusing of the microwaves at the desired position against the rock face 240. The distance sensors 332 can prevent collision between the applicator 212 and the rock face 240.

As described above in the context of the system 100, the system 200 may include various sensors. The sensors may include a sensor 331 such as LIDAR, machine vision, an infrared or visible light camera, or any other sensors described in the system 100. In some embodiments, the one or more sensors 331 may also be configured to track audible and/or visual indications of cracking at the surface and/or within the rock or material. Ground penetrating radar may also be used for real time and/or post degradation determination.

Articulable Waveguide Joints

Figure 7A:
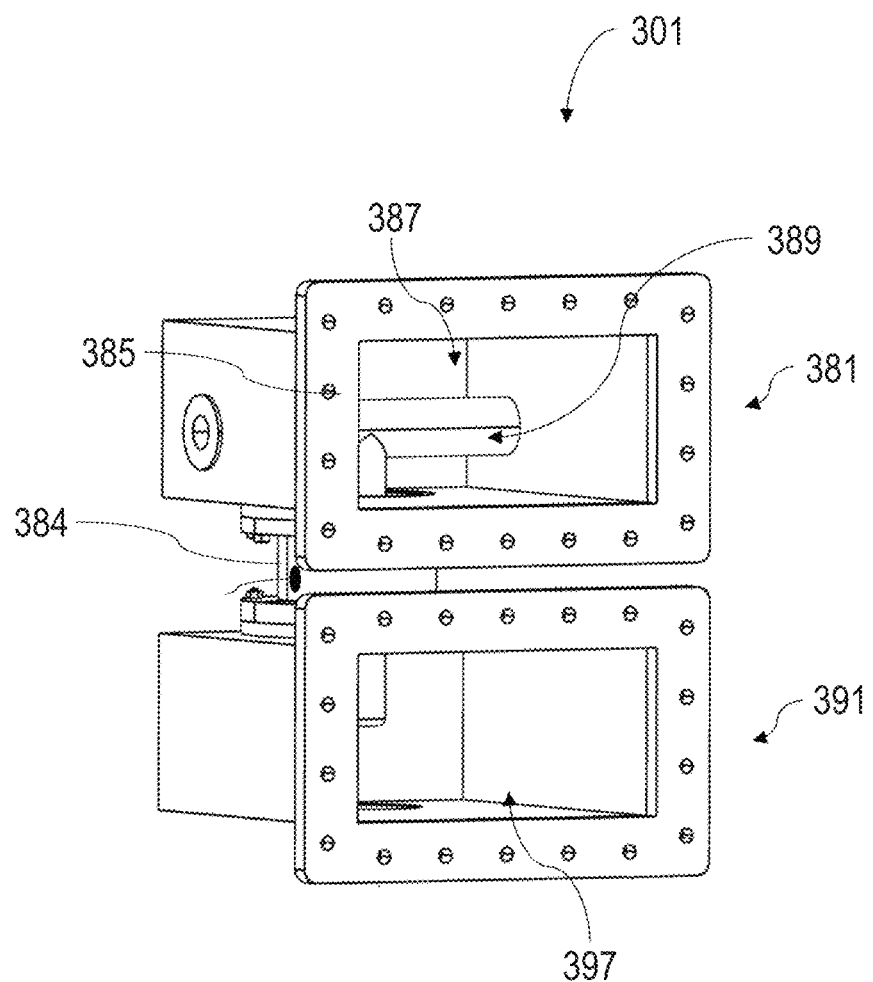
FIG. 7A is a perspective view of a waveguide joint of the microwave preconditioning system of FIGS. 4A-4B for rotatably connecting waveguide segments.
Figure 7B:
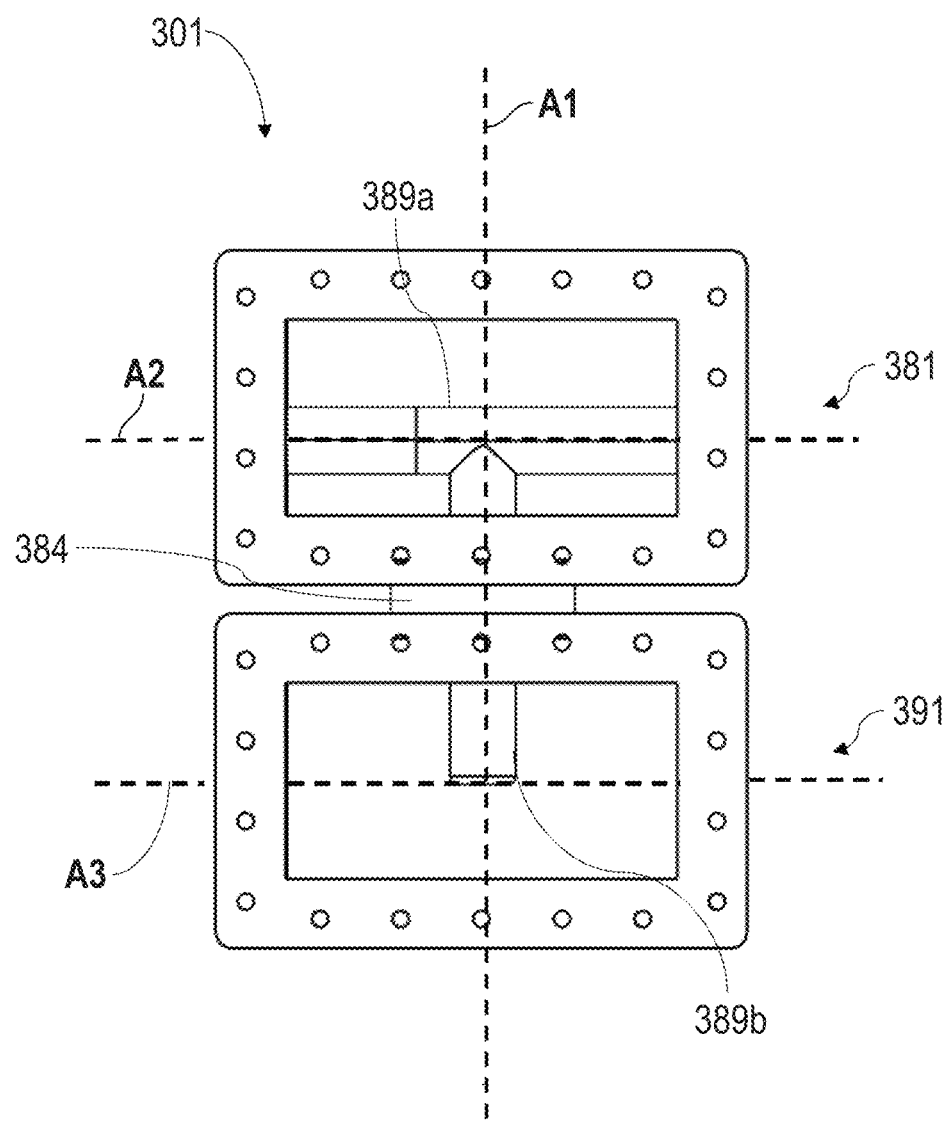
FIG. 7B is a front view of the waveguide joint of FIG. 7A.

FIGS. 7A-7B are various perspective views of embodiments of the rotatable joint 301 that may be used with the articulable waveguide 214. The rotatable joint 301 is shown with the first and second waveguide segments 381, 391 removed for clarity. Any or all of the rotatable joints of the articulable waveguide 214 may include the structural details described herein for the rotatable joint 301. Thus, there may be two, three, four, five, six, seven, eight, nine, ten, or more of the joints 301. In some embodiments. The rotatable joint 301 may include any of the features of the rotatable joint described in U.S. Provisional Application No. 63/152,248 titled "ARTICULATED WAVEGUIDE" filed Feb. 22, 2021, or in U.S. patent application Ser. No. 17/651,683 titled "ARTICULATED WAVEGUIDE" filed on the same date as the instant application, the entire content of each of which is incorporate by reference herein for all purposes and forms a part of this specification.

The joint 301 may comprise a rotational connector 384. The first waveguide segment 381 and the second waveguide segment 391 may be rotatably attached or connected with each other at the joint 301 via the rotational connector 384. The rotational connector 384 may rotatably connect respective ends of the waveguide segments 381, 391. In some embodiments, the waveguide system 200 may include more than two waveguide segments and a corresponding number of joints 301 and rotational connectors 384. The rotational connector 384 may be made of metal or other suitable materials. The rotational connector 384 may include rotatable portions. The waveguide segments and/or rotatable rotational connector 384 may be configured to be rotated by an actuator, which may be controlled by the control system 230, in order to rotate the waveguide segments 381, 391 to which respective portions of the rotational connector 384 are attached. In some embodiments, the rotational connector 384 may be in other locations, for example on the side, top, or bottom of the joint 301. There may be one or more rotational connectors at each joint 301.

The rotatable joint 301 may include an antenna 389. The antenna 389 may be positioned within or internal to the rotatable joint 301. The antenna 389 may be located in or near a center of rotation of a rotational connector 384. The antenna 389 may be positioned closer to rear walls of the waveguide segments 381, 391 than openings 387, 397. The positioning of the antenna 389 may avoid contact with any surrounding structures, such as the rotational connector 384 and the walls of the waveguide segments 381, 391. This "no contact" configuration may prevent wear and tear of the antenna 389 and the surrounding structures. The lack of contact may further allow for the surrounding structures to be made of thin and low mass material. Further, the separation between the structural elements of the articulable waveguide 214 and the antenna 389 improves efficiency as it allows for more compact articulation. Additionally, the embodiments described herein provide the benefit of low reflection losses. For example, the reflection losses may be better than −40 dB depending on the frequency.

The antenna 389 may include the first antenna segment 389a. The antenna 389 may include the second antenna segment 389b. The first and second antenna segments 389a, 389b may be elongated. The antenna segments 389a, 389b may have a tube like shape. The antenna segments 389a, 389b may be at least partially hollow. The antenna segments 389a, 389b may be T-shaped.

The antenna segments 389a, 389b may have various locations and orientations. The first antenna segment 389a may define and extend along a longitudinal antenna axis A2. The antenna axis A2 may be located at the geometric center of the waveguide channel. The antenna axis A2 may be perpendicular to the rotational axis A1. The antenna axis A2 may intersect the rotational axis A1.

Further, the antenna segments 389a, 389b may be at least partially, or entirely, located one or the other sides of the joint. The first antenna segment 389a may be entirely on one side, and the second antenna segment 389b may traverse the joint. The first antenna segment 389a may extend to inner surfaces of the sidewalls of the first waveguide segment 381. The first antenna segment 389a may contact and/or be supported by the sidewalls, or intermediate structures such as fittings, brackets, etc. The second antenna segment 389b may extend from the first antenna segment 389a and not contact any other structures. The second antenna segment 389b may thus float within the microwave channel and only contact the first antenna segment 389a. The antenna 389 may thus be stationary with respect to, and rotate with, the first waveguide segment 381. The second antenna segment 389b may rotate relative to the second waveguide segment 391. The second antenna segment 389b may be omnidirectional such that microwave energy is transmitted three hundred sixty degrees, allowing for full relative rotation of the two waveguide segments 381, 391, as described.

The second antenna segment 389b may be positioned at least partially within the first waveguide segment 381, the rotational connector 384, and/or the second waveguide segment 391. The second antenna segment 389b may extend from the first antenna segment 389a. The second antenna segment 389b may extend from a centrally located point on the first antenna segment 389a. The second antenna segment 389b may be oriented parallel to the rotational axis A1. The second antenna segment 389b may be positioned along the rotational axis A1. The first and second antenna segments 389a, 389b may form a T-Shape. The second antenna segment 389b may be positioned vertically within the articulable waveguide 214, and/or the first antenna segment 389a may be oriented horizontally, as oriented in the figure. A first end of the second antenna segment 389b may be connected to the first antenna segment 389a. The first antenna segment 389a may extend away from the second antenna segment 389b, in one or more directions, for example two as shown. A second end of the second antenna segment 389b may extend into the rotational connector 384. The second end of the second antenna segment 389b may extend into the second waveguide segment 391. The second end of the second antenna segment 389b may be located at an intersection of the rotational axis A1 and the transverse axis A3. The antenna 389 may thus have a "T" shape as shown.

In some embodiments, the antenna 389 may be fixed solely to the first waveguide segment 381. The antenna 389 may be fixed to first waveguide segment 381 via the first antenna segment 389a. A first end of the first antenna segment 389a may be connected to a first wall of the first waveguide segment 381. A second end of the first antenna segment 389a may be connected to a second wall of the first waveguide segment 381. The second antenna segment 389b may be solely coupled to the first antenna segment 389a.

In some embodiments, the first and/or second antenna segments 389a, 389b may be in other locations and/or orientations. For example, the orientation of the antenna 389 may be flipped, such that the first antenna segment 389a is located within the second waveguide segment 391, and the second antenna segment 389b extends into and terminates within the first waveguide segment 381, etc. As a further example, the axis A2 may be offset from the geometric center of the waveguide channel either vertically up or down as oriented in the figure. The lower end of the second antenna segment 389b may extend farther than the transverse axis A3, or not extend to the transverse axis A3. In some embodiments, the antenna segments 389*a* and/or 389*b* may be linear, non-linear, curved, other contours, or combinations thereof.

The articulable waveguide 214 may receive and guide therethrough microwave energy or signals generated by the microwave generator 228. The energy may be received into and through the first waveguide segment 381 and transmitted to the second waveguide segment 391 via the antenna 389. The antenna 389 may thus serve as a transmitter of the energy from the first waveguide segment 389*a*, through the rotatable joint 301 such as through the rotational connector 384, and into the second waveguide segment 389*b*. The first waveguide segment 381 may function as an entry. The second waveguide segment 391 may function as an exit. The antenna 389 may thus receive and transmit the energy. The antenna 389 bridges or connects the first and second waveguide segments 381, 391. The first antenna segment 389*a* may absorb the electromagnetic waves. The electromagnetic waves may then transmit or travel down the second antenna segment 389*b*. The second waveguide segment 391 may then guide the energy therethrough. The articulable waveguide 214 is bi-directional as it may emit energy in two directions corresponding to the angle of rotation. The articulable waveguide 214 as described herein may maintain the polarization of the energy travelling therethrough.

The energy being transmitted by the articulable waveguide 214 may be measured in real time by one or more sensors. The one or more sensors may be attached to the articulable waveguide 214. One or more sensors may be attached to the waveguide segments 381, 391. The energy being emitted from the microwave generator 228 may be measured. The energy being transmitted through the applicator 212 into the rock 240 may be measured. The energy may be measured in both directions in the articulable waveguide 214, for example the entry energy and the exit energy. The transmitted and/or reflected power may also be measured. The power entering the surrounding environment may be measured. By tracking and/or measuring the energy and/or power, the user may see what power and/or energy is actually being applied to the rock and/or material. Further, the energy transmission and reflection measurements may be used to determine temperature. This may be beneficial as rock electromagnetic characteristics may change with temperature. Such measurements may indicate how lossy the one or more joints 301 may be in use.

Microwave Energy Applicators

Figure 8:
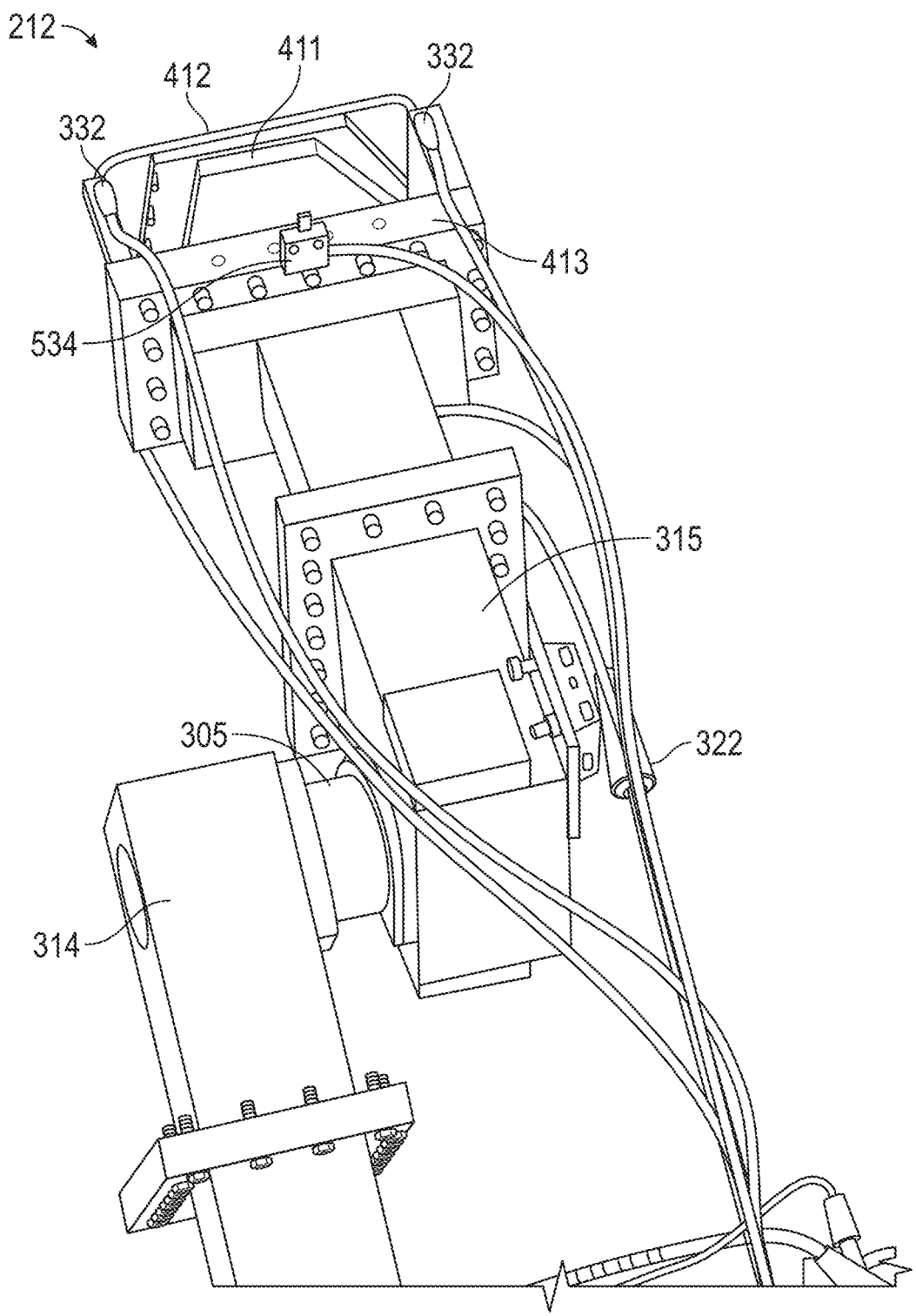
FIG. 8 shows a rear view of a distal end of the articulable waveguide of the microwave preconditioning system of FIGS. 4A-4B including the applicator and sensors of the robotic control system.
Figure 9:
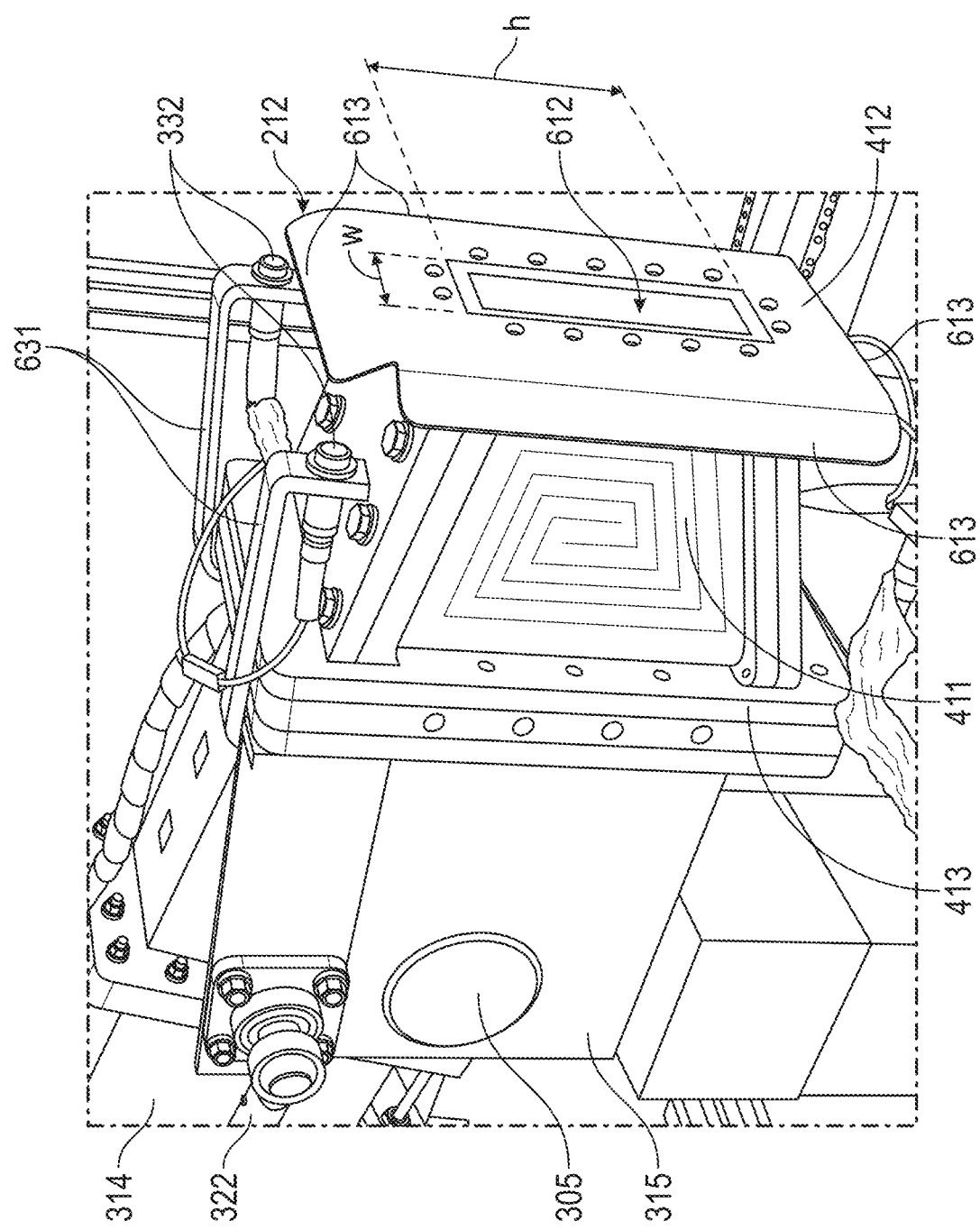
FIG. 9 shows a front perspective view of the applicator and sensors of the robotic control system of the microwave preconditioning system of FIGS. 4A-4B.

As shown in FIGS. 8-9, the applicator 212 may have a decreasing cross-sectional area in the distal direction. The applicator 212 may include a proximal end 413 and a distal end 412. The proximal end 413 may have a rectangular cross section that tapers down through a body 411 (e.g., pyramidal body) to the distal end 412 with a rectangular cross section. A plate 611 may be fixed at the distal end 412. The sensors 332 may be mounted on flanges 631 attached to either side of the applicator 212. Another sensor 534 can be mounted on the distal end of the waveguide 214 or on the applicator 212. The sensor 534 can a monitoring sensor, such any of the sensors described above (e.g. microphone, EMF sensor, temperature sensor, distance sensor, camera, etc.).

The plate 611 may be a rectangular plate. The plate 611 may include an aperture 612. The aperture 612 may have a rectangular shape. The aperture 612 may include a height h and a width w. The plate 611 may be surrounded by backwardly bent flanges 613 (e.g., one on each of four sides).

Figure 10A:
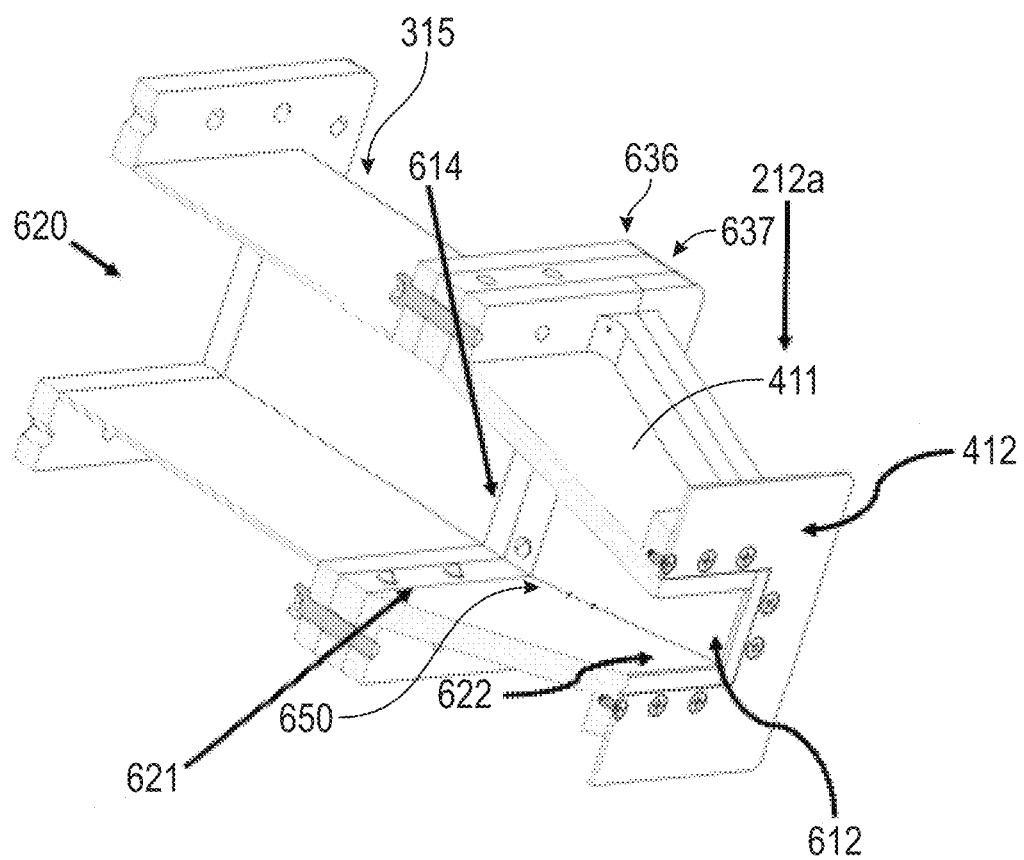
FIGS. 10A and 10B are cross-sectional views of another embodiment of an applicator having a dielectric insert.

FIG. 10A shows another embodiment of an applicator 212*a*, similar to the applicator 212. Any of the applicators described herein, such as the applicator 212 or 212*a*, may have any of the features of any of the various applicators described in U.S. Provisional Application No. 63/152,253 titled "MICROWAVE ENERGY APPLICATOR" filed Feb. 22, 2021, and U.S. patent application Ser. No. 17/651,629 titled "MICROWAVE ENERGY APPLICATOR" filed on the same date as the present application, the entire content of each of which is incorporated by reference herein for all purposes and forms a part of this specification. The applicator 212*a* can be attached to the waveguide segment 315 in isolation from the remainder of the articulable waveguide 214. The waveguide segment 315 may have a rectangular cross-section, or other shape. An internal channel defined by the waveguide segment 315 may thus be rectangular. The waveguide segment 315 may be positioned at an end of the robotic arm and have a first flange 636 attached to a second flange 637 of the applicator 212*a*. One or more of the plurality of waveguide segments 315 may be included in the articulable waveguide 214 with flanges or similar attachments to attach the waveguide segments 315 to each other and/or to the microwave generator.

The waveguide segment 315 may include a waveguide inlet 620 at a proximal end thereof and a waveguide outlet 621 at a distal end thereof. "Proximal" and "distal," as used herein, have their usual and customary meaning and include, without limitation, directions toward and away from, respectively, the microwave generator along the plurality of waveguide segments 315. The waveguide segment 315 may have different cross-sectional profiles, including, but not limited to, rectangular, circular, oval, multiple-sided, etc. Microwaves may enter the waveguide segment 315 at the waveguide inlet 620, travel through the waveguide segment 315, exit the waveguide segment 315 at the waveguide outlet 621, and travel into or toward the applicator 212*a*.

The microwave energy applicator 212*a* may include a body 411 defining a channel 650 that extends from the proximal end 413 at an applicator inlet 614 to an applicator outlet 612 at the distal end 412. The channel 650 may be in electromagnetic communication with a waveguide channel of the waveguide segments 315 forming the robotic arm. The space within the waveguide channel may be continuous with the space within the channel 650. In some embodiments, the waveguide channel may be in communication with an insert of the applicator 212*a*. The applicator inlet 614 and applicator outlet 612 may have the same or different cross-sectional profiles, including, but not limited to, rectangular, circular, oval, and multi-sided. The applicator inlet 614 may have a larger cross-sectional area than the applicator outlet 612. The cross-sectional area of the channel 650 may narrow from the applicator inlet 614 to the applicator outlet 612.

The applicator inlet 614 and the waveguide outlet 621 may have the same or similar cross-sectional area. The applicator inlet 614 and the waveguide outlet 621 may be aligned so that the applicator 212*a* may be connected to the waveguide segment 315. A continuous channel with smooth inner surfaces of the sidewalls may be formed between the waveguide inlet 620 and the applicator outlet 612.

In some embodiments, the channel 650 from the applicator inlet 614 to the applicator outlet 612 may narrow. Such narrowing minimizes reflection of the microwave energy, for example, in a proximal direction back toward the terminal waveguide segment 315. In some embodiments, an angle of narrowing of the channel 650 from the applicator inlet 614 to the applicator outlet 612 may include an angle or angles of narrowing that allow different levels of collimation of a transmitted microwave beam.

The applicator outlet 612 may form a beam window through which the microwave beam may be transmitted. Transmission of the microwave energy received from the waveguide segment 315 through the narrow beam window may allow concentration of the received energy by up to two, three, four, five, six, seven, eight, nine, ten times or more times relative to the energy within the waveguide channel. In some embodiments, dimensions of the beam window may include dimensions that allow different levels of collimation of the transmitted microwave beam.

The applicator 212a may have a distal end 412 with a flange. The flange may extend around a perimeter of the beam window. The flange may extend radially outward. The cross-sectional area of the flange may be smaller than the cross-sectional area of the waveguide 315 and/or the waveguide channel. The flange may act as a shield to reduce energy leakage outside the applicator 212a and may increase total energy transfer.

Figure 10B:
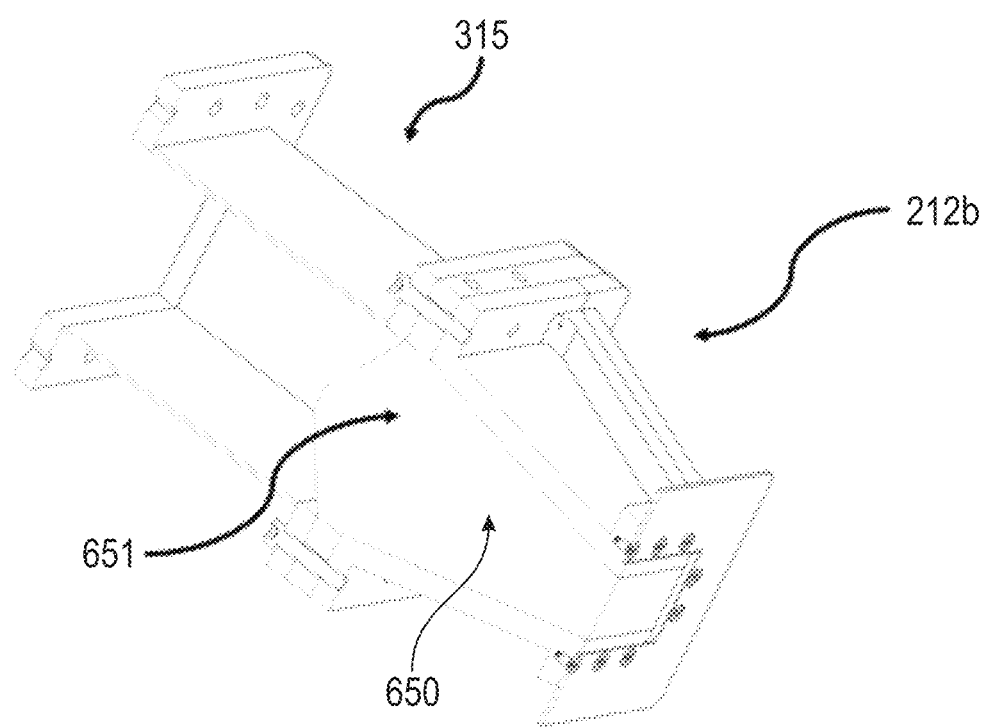

FIG. 10B shows another embodiment of an applicator 212b, similar to the applicator 212. The applicator 212b may be like the applicator 212 with the addition of an insert 651 that may fit at least partially within the channel 650. A surface of an end of the insert 651 may be located at the beam window. The surface may be planar. The surface may be coplanar with the window 612 and/or the flange of the distal end 412. In some embodiments, the insert 651 may fit within the applicator channel 650 to not have any space or gap between the channel sidewalls and the insert 651. In some embodiments, the insert 651 may fill the entire volume of the channel 650.

The insert 651 may be made from microwave-transparent materials. In some embodiments, the insert 651 may include microwave-transparent materials with different permittivity values. Permittivity values of the material of the insert 651 may include, but are not limited to, 1 to 15 Farad/m. In some embodiments, the insert may include a material with a permittivity value between that of air (1 Farad/m) and hard rock (15 Farad/m). In some embodiments, the material for the insert 651 may include Polytetrafluoroethylene (PTFE). In some embodiments, the material for the insert may include combinations of materials which have high microwave transparency. The insert 651 may have different cross-sectional profiles, including, but not limited to, rectangular, circular, oval, and multi-sided. In some embodiments, the insert 651 may be pyramidal in structure. The cross-sectional area of the insert 651 may increase and then decrease in a distal direction toward the exit from the applicator inlet to the applicator outlet. In some embodiments, the insert 651 may define two pyramidal ends.

Figure 10C:
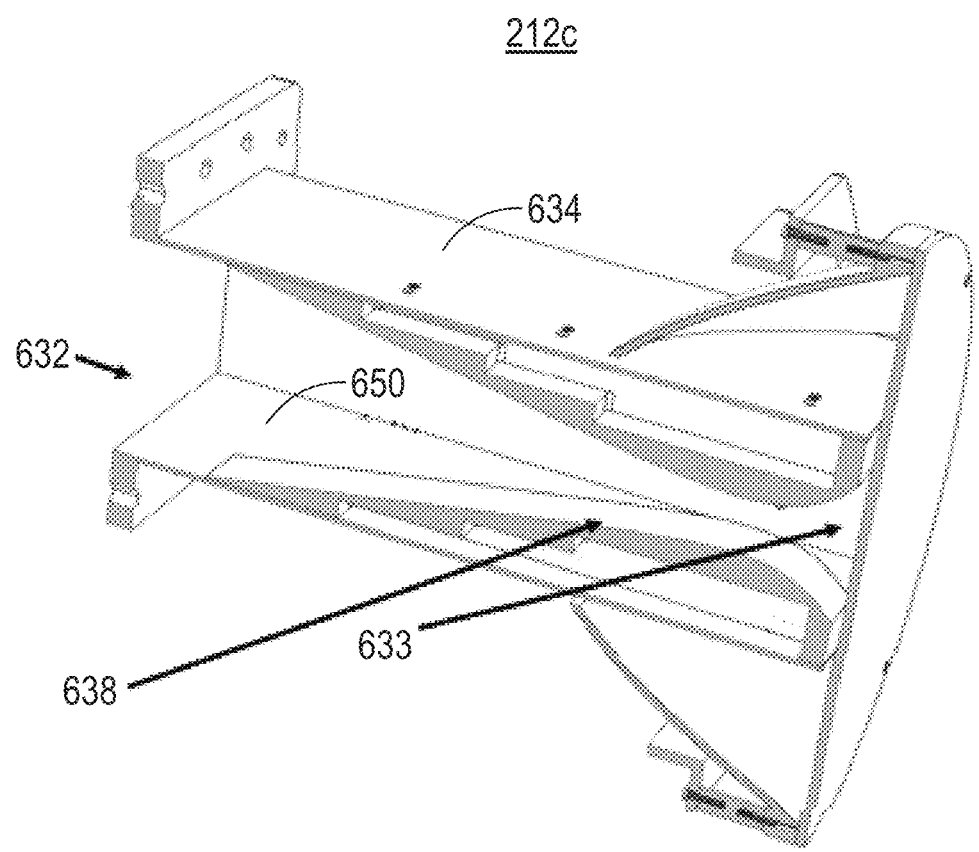
FIG. 10C is a cross-sectional view of another embodiment of an applicator having internal ridges.

FIG. 10C shows another embodiment of a microwave energy applicator 212c that may be used with the system of FIG. 1. As described herein, the applicator 212c may be connected to a waveguide segment 315. Microwaves may enter the waveguide segment 315 at the waveguide inlet, travel through the waveguide segment and exit the waveguide segment at the waveguide outlet, and travel into or toward the applicator 212c.

An applicator inlet 632 and the waveguide outlet may have the same or similar cross-sectional area. The applicator inlet 632 and the waveguide outlet may be aligned so that the applicator 212c may be connected to the waveguide segment 315. A continuous channel with smooth inner surfaces of the sidewalls may be formed between the waveguide inlet and an applicator outlet 633.

The microwave energy applicator 212c may include a body 634 defining a channel 650 that extends from an applicator inlet 632 to an applicator outlet 633. The channel 650 may be in electromagnetic communication with a waveguide channel of the waveguide segments 315 forming the robotic arm 214. The space within the waveguide channel may be continuous with the space within the channel 650. The applicator inlet 632 and applicator outlet 633 may have the same or different cross-sectional profiles, including, but not limited to, rectangular, circular, oval, and multi-sided. The applicator inlet 632 may have a larger cross-sectional area than the applicator outlet 633. The cross-sectional area of the channel 650 may narrow from the applicator inlet 632 to the applicator outlet 633.

The applicator 212c may include one or more ridges 638 located within the channel 650 abutting one or more inner walls of the channel 650. In some embodiments, the ridge 638 may protrude into the applicator channel 650. In some embodiments, varying thickness of the ridge 638 from the applicator inlet 632 to the applicator outlet 633 may cause narrowing of the channel 650. Such narrowing minimizes reflection of the microwave energy, for example, in a proximal direction back toward the terminal waveguide segment 315. In some embodiments, an angle of narrowing of the channel 650 from the applicator inlet 632 to the applicator outlet 633 may include an angle or angles of narrowing that allow different levels of collimation of a transmitted microwave beam.

Stowable Modules

Figure 11A:
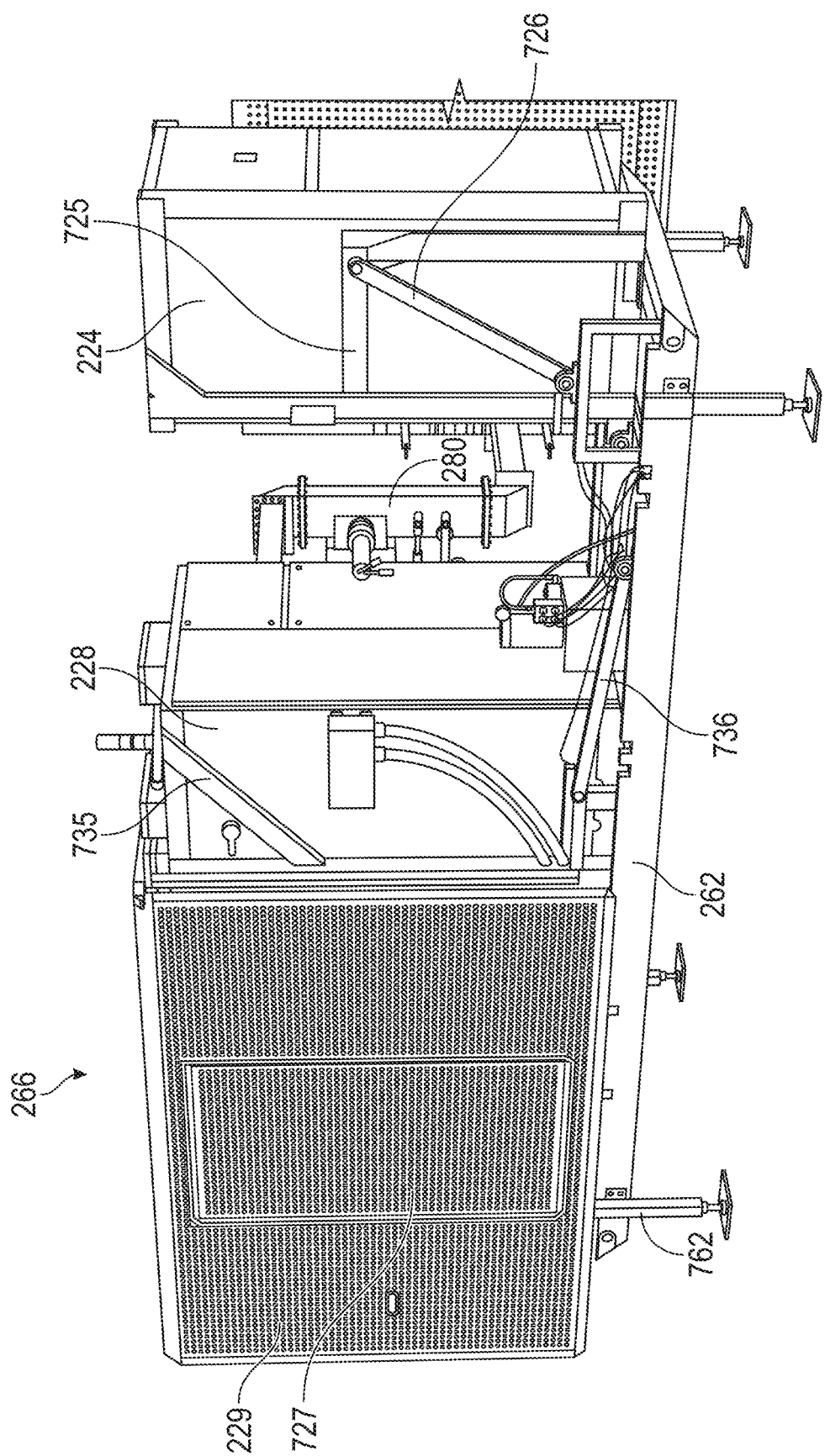
FIG. 11A is a perspective view the generator module of the microwave preconditioning system of FIGS. 4A-4B including a microwave generator, power transformer, cooling module, operator Faraday cage, and user control systems.
Figure 11B:
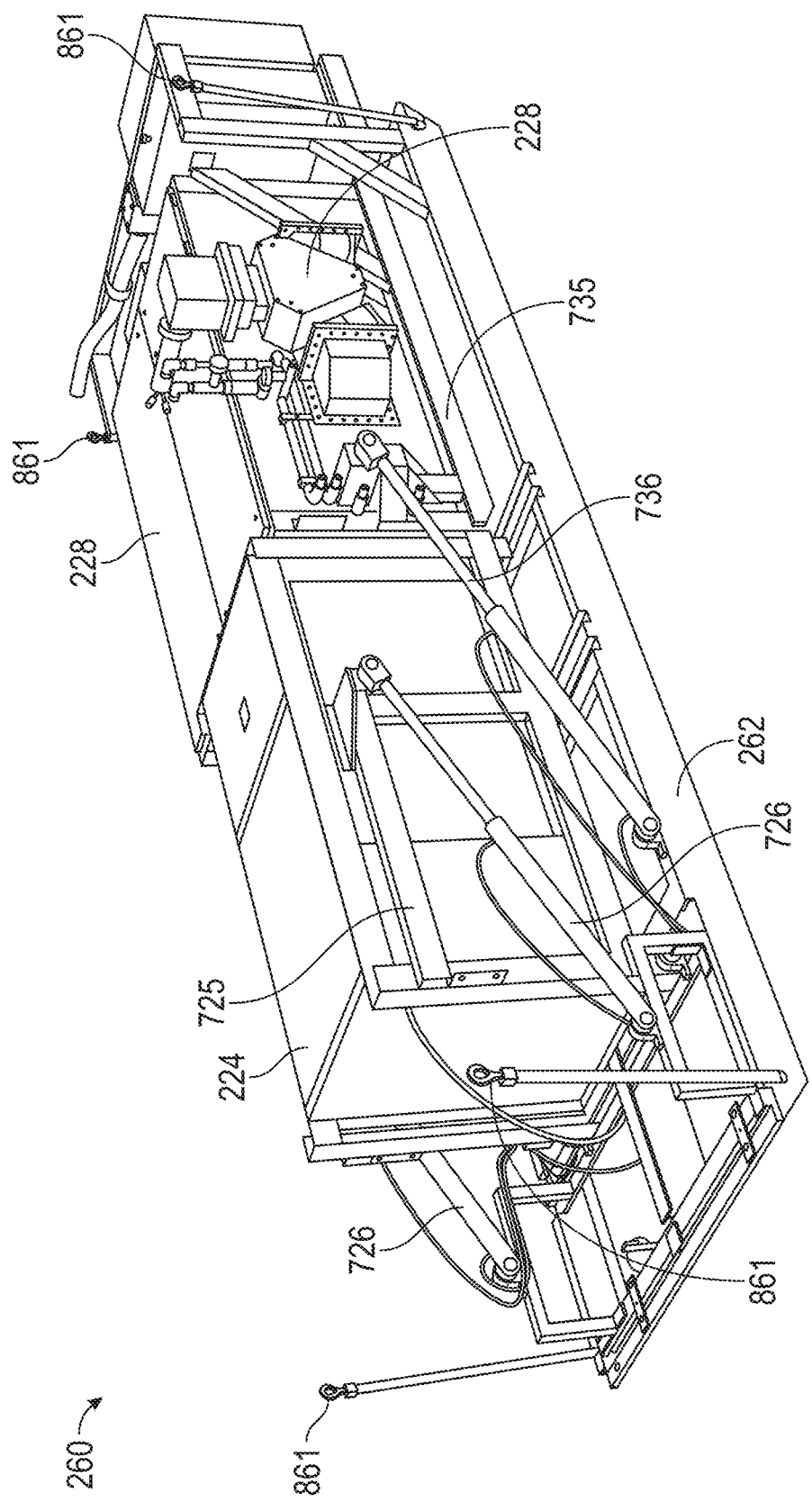
FIG. 11B is a perspective view of the generator module of FIG. 11A in a compact configuration.

FIG. 11A shows the generator module 260. The generator module 260 may include components mounted on the platform 262. The platform 262 may include foldable, retractable or removable legs 762. The microwave generator 228 may be mounted in a folding frame 735 controlled by a hydraulic actuator 736. The folding frame 735 and microwave generator 228 may be rotated about an axis into a compact configuration shown in FIG. 11B. The cooling module 224 may be mounted in a folding frame 725 controlled by a hydraulic actuator 726. The folding frame 725 and cooling module 224 may be rotated about an axis into a compact configuration shown in FIG. 11B. The control room 229 can be surrounded by a protective barrier 727, such as a Faraday cage. The platform 262 may include one or more lifting brackets 861 for transporting the disassembled generator module 260. The generator module 260 and/or applicator module 250 can include one or more emergency stop switches. The emergency stop switches can be included, for example, on the microwave generator 228, the cooling module 224, the articulable waveguide 214 or elsewhere. Control system of the system 200 can include a remote stop (e.g., accessible at an above-ground location). The platform 262 (and/or platform 252) on which the generator 228 is mounted can include roll and pitch sensors to level platform and/or components thereon. The folding frames of the generator and cooling module can include limit switches that prevent either from moving before the other is out of the way. The generator module 260 can include plugs for user interfaces and/or display of video of the applicator module 250.

Setup of the system 100 can include transportation of the generator module 260 and applicator module 250 to the rock face 240. The legs 762 can be moved into position to stabilize the module 260. The cooling module 224 and/or the microwave generator 228 can be unfolded/moved into operative position. A power source (e.g., electrical) can be connected with the generator module 260. A first end of the waveguide 280 can be attached with the microwave generator. A second end of the waveguide can be attached to with the articulable waveguide 214 of the applicator module 250. To stow the generator module 260, the operations can be reversed.

Mobile Systems with Robotic Arm Waveguide

Figure 12A:
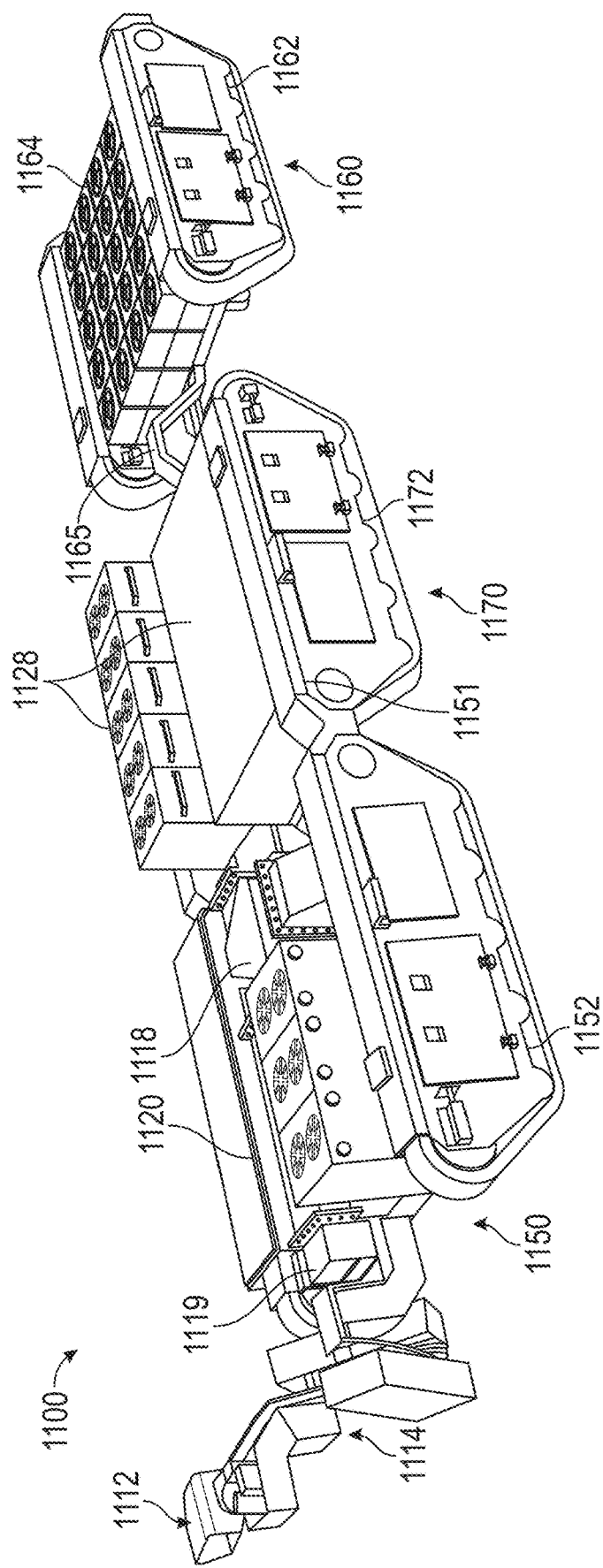
FIG. 12A is a front perspective view of another embodiment of a microwave preconditioning system including three robotic modules each having a mobility system. The robotic modules may respectively include an applicator module, a generator module, and a power module.
Figure 12B:
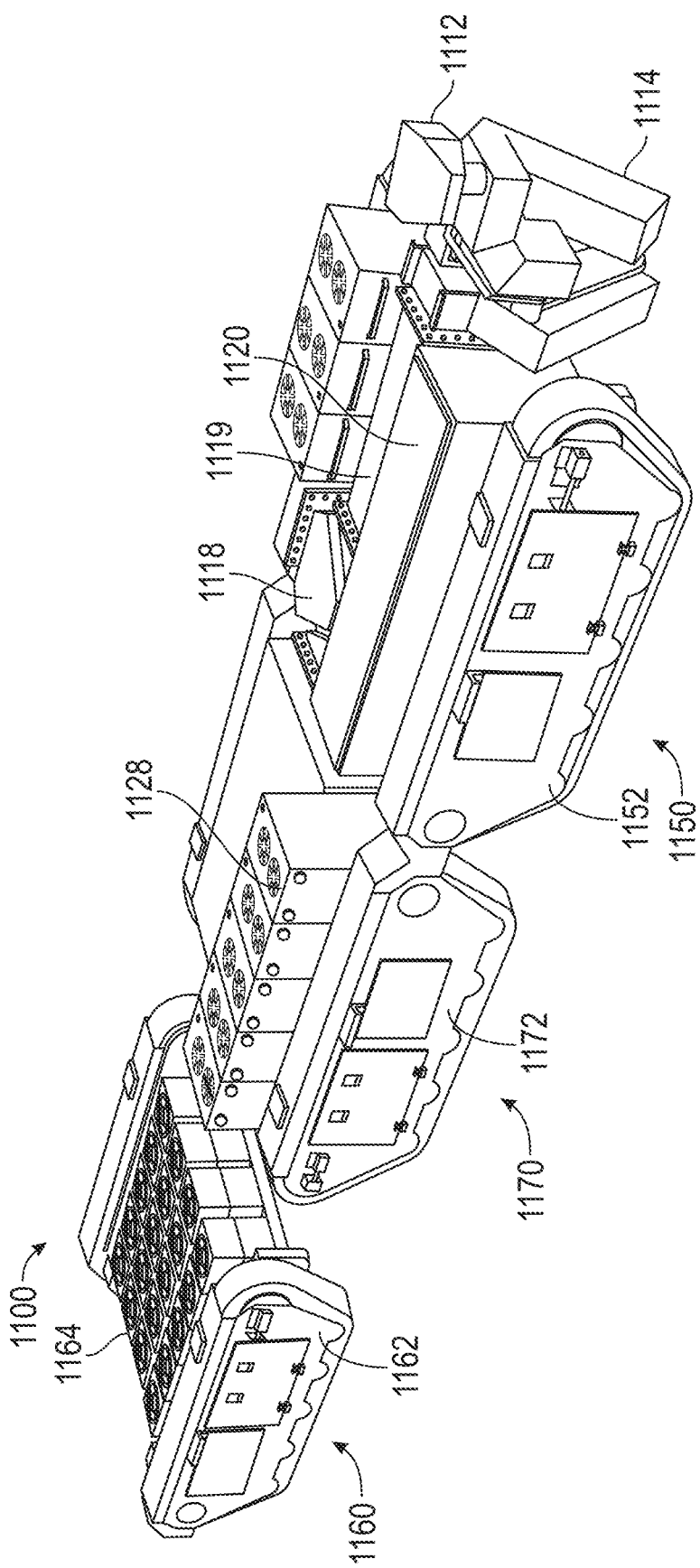
FIG. 12B is a rear perspective view of the microwave preconditioning system of FIG. 12A.

FIGS. 12A-12B show an example of a microwave preconditioning system 1100. The system 1100 may include the components described above in the system 100. The system 1100 may include an applicator module 1150 for delivering microwaves to a rock wall 1140. The applicator module 1150 may include an applicator 1112, an articulable waveguide 1114, a cooling module 1120, a microwave generator 1118, a waveguide and/or tuner and/or a mobility platform 1152. The applicator 1112 may be connected with a distal end of the articulable waveguide 1114. The articulable waveguide 1114 may be mounted on the robotic control system. A proximal end of the articulable waveguide 1114 may be coupled with a waveguide 1119. The articulable waveguide 1114 and the robotic control system may be mounted on the mobility platform 1152. The mobility platform 1152 may include tracks, wheels, or other movement mechanisms.

The system 1100 may include a generator module 1170. The generator module 1170 may include a filter bank, a transformer 1128, and/or a mobility platform 1172. An generator module 1170 may be connected with the applicator module 1150 by one or more power cables. A linkage 1151 may releasably couple together the applicator module 1150 and the generator module 1170. The applicator module 1150 and the generator module 1170 may be jointly operable or independently operable.

The system 1100 may include a power module 1160. The power module 1160 may include power source (e.g., batteries) 1164. The power module 1160 may include or a mobility platform 1162. The power module 1160 may be connected with the generator module 1170 by one or more power cables. A linkage 1165 may releasably couple together the generator module 1170 and the power module 1160. The power module 1160 may be jointly operable or independently operable from the applicator module 1150 and the generator module 1170.

Figure 13A:
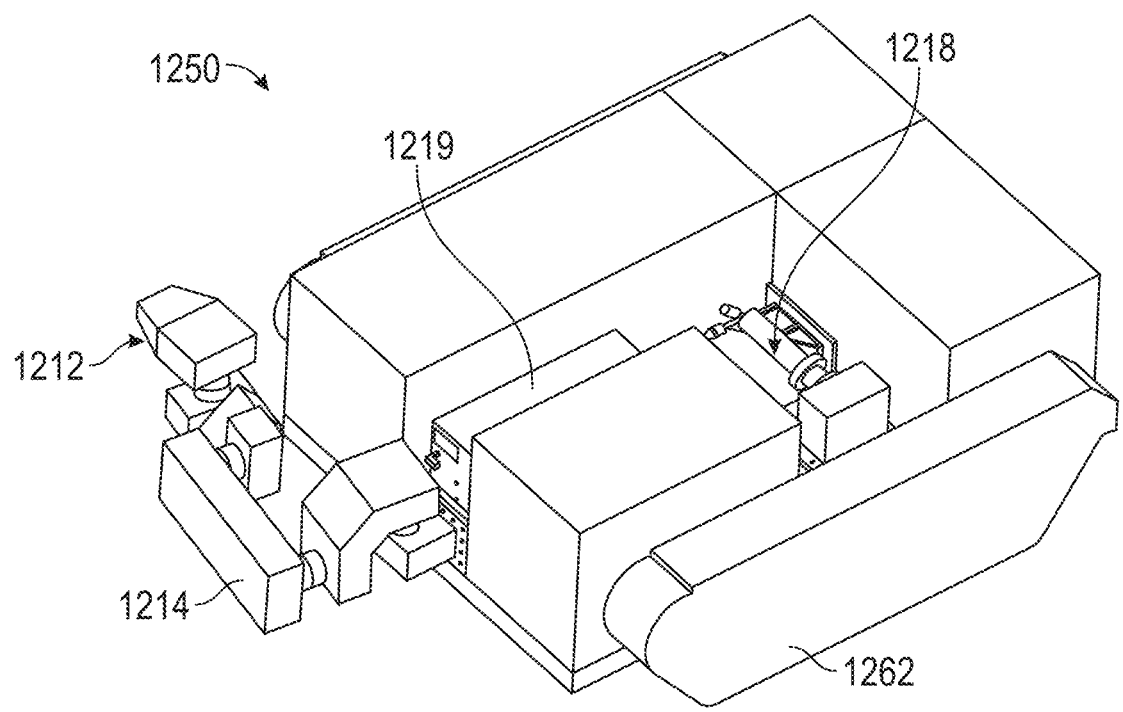
FIG. 13A is a perspective view of another embodiment of a mobile robotic applicator module of a microwave preconditioning system including a magnetron microwave generator.
Figure 13B:
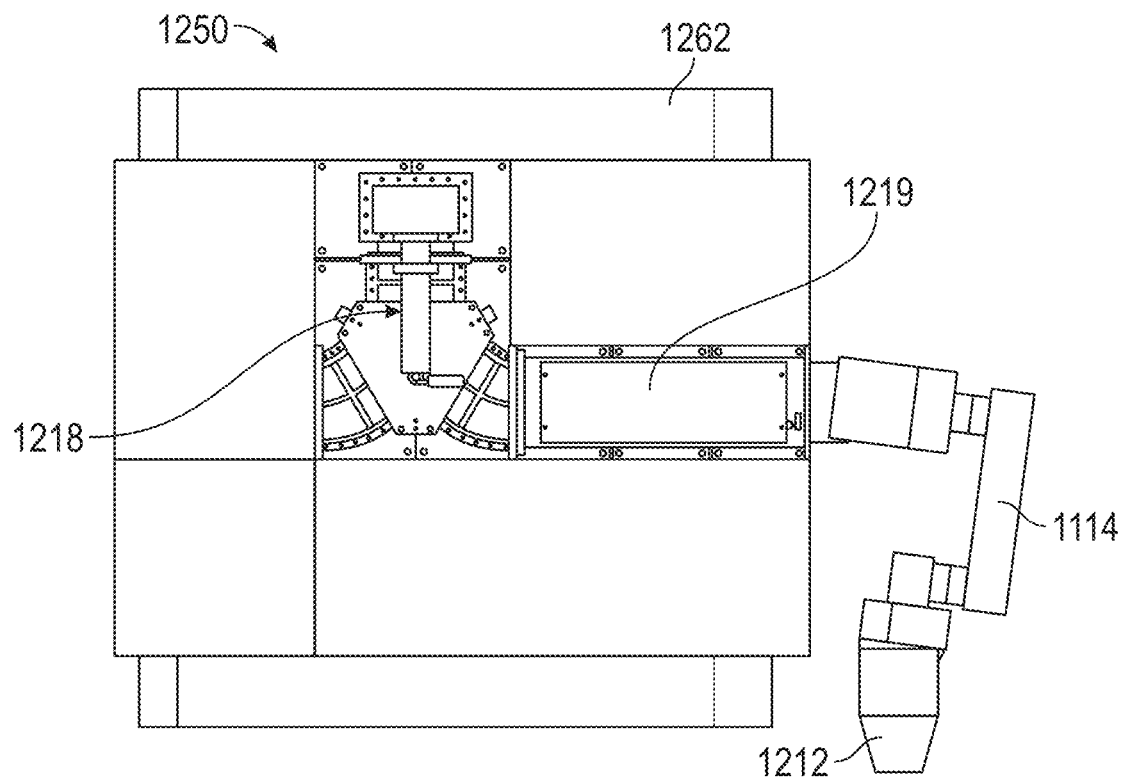
FIG. 13B shows a top view of the robotic applicator module of FIG. 13A.

FIGS. 13A-B show another example of an applicator module 1250 including an articulable waveguide 1214 with an applicator 1212 connected with an isolator 1218 through a waveguide 1219 and a tuner. The components of the module 1250 are mounted on a mobility platform 1262. The applicator module 1250 may include other components of the system 100.

Figure 14A:
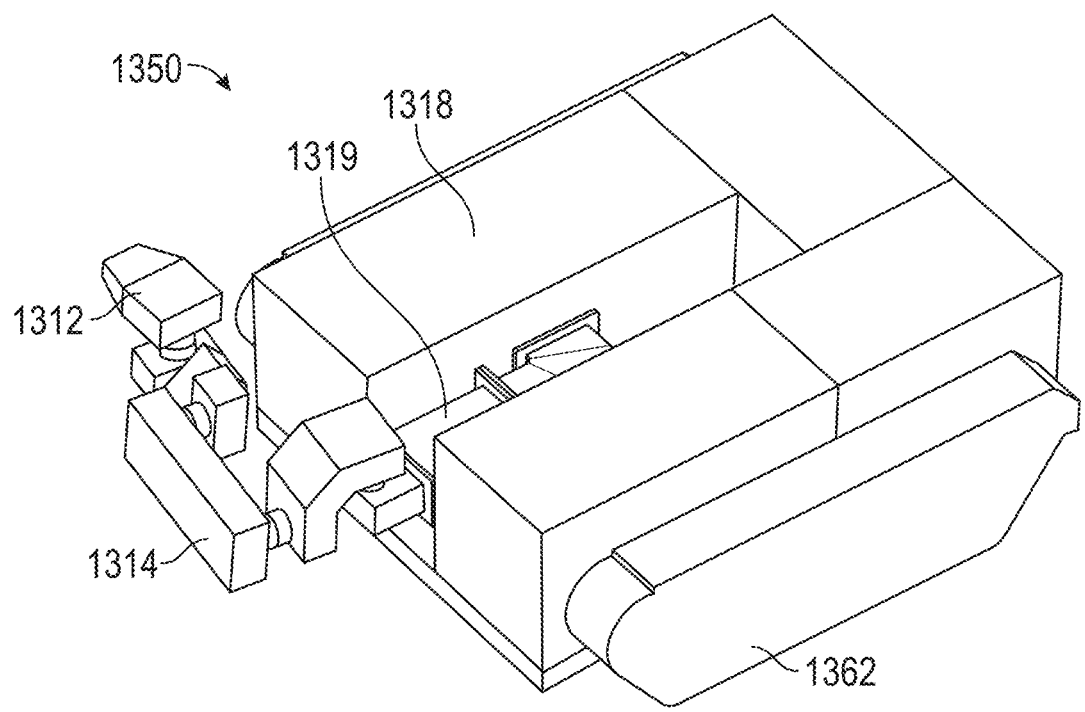
FIG. 14A is a perspective view of another embodiment of a mobile robotic applicator module of a microwave preconditioning system including a solid state microwave generator.
Figure 14B:
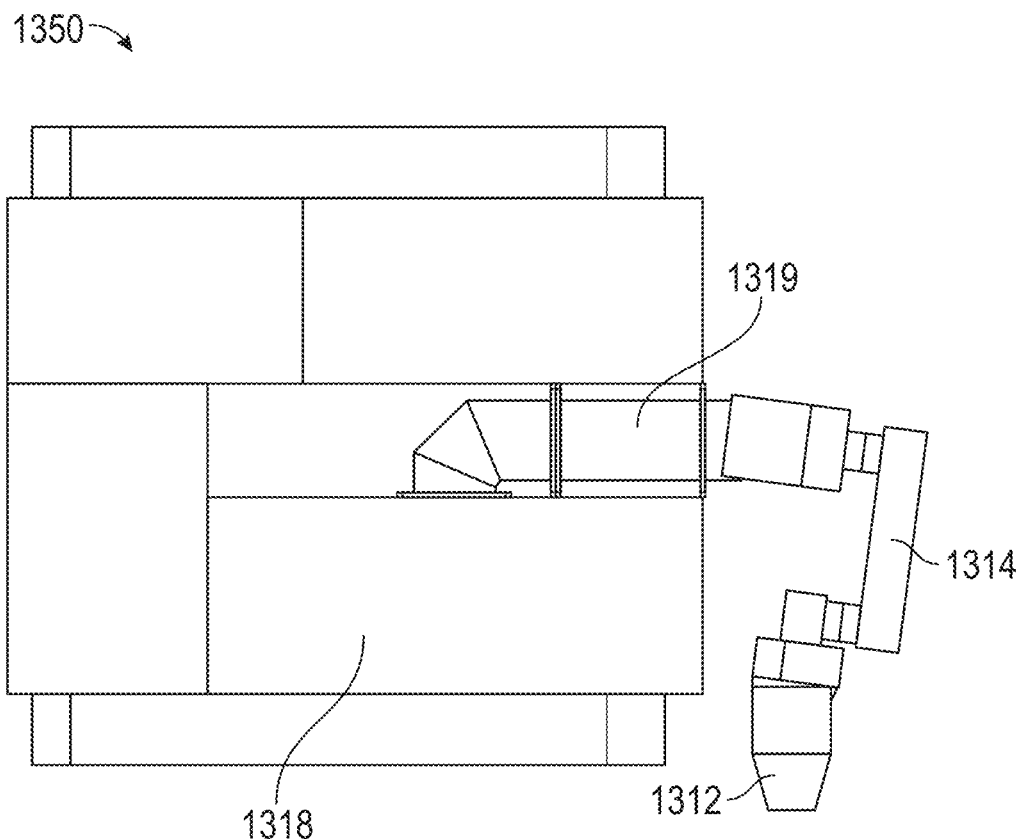
FIG. 14B shows a top view of the robotic applicator module of FIG. 14A.

FIGS. 14A-B show another example of an applicator module 1350 including an articulable waveguide 1314 with an applicator 1312 connected with a solid-state microwave generator 1318 through a waveguide 1319. The components of the module 1350 are mounted on a mobility platform 1362. The applicator module 1350 may include other components of the system 100.

Figure 15A:
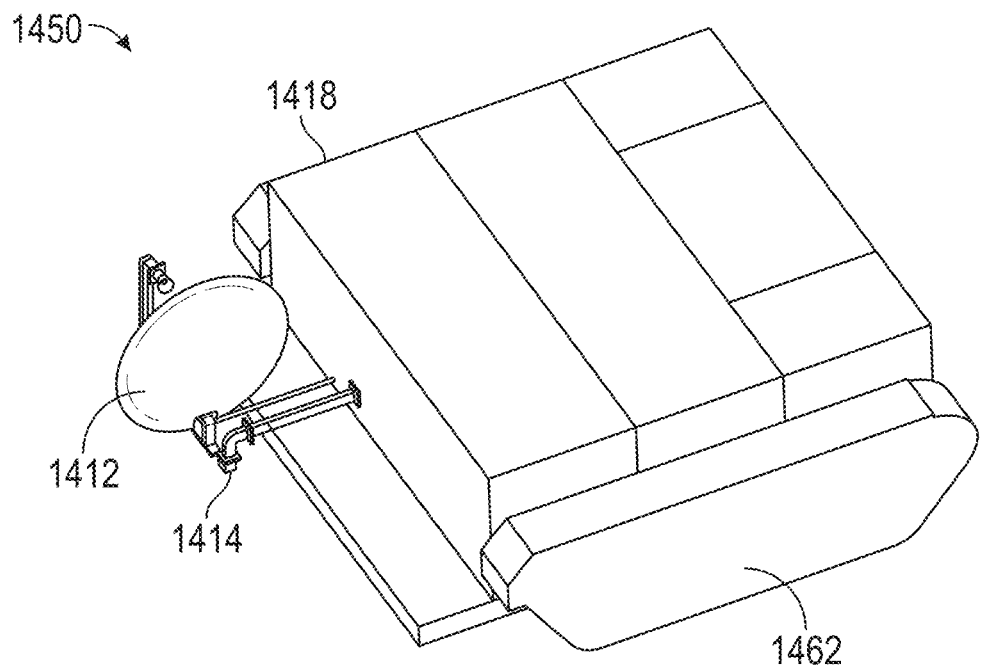
FIG. 15A is a perspective view of another embodiment of a mobile robotic applicator module of a microwave preconditioning system including a klystron microwave generator.
Figure 15B:
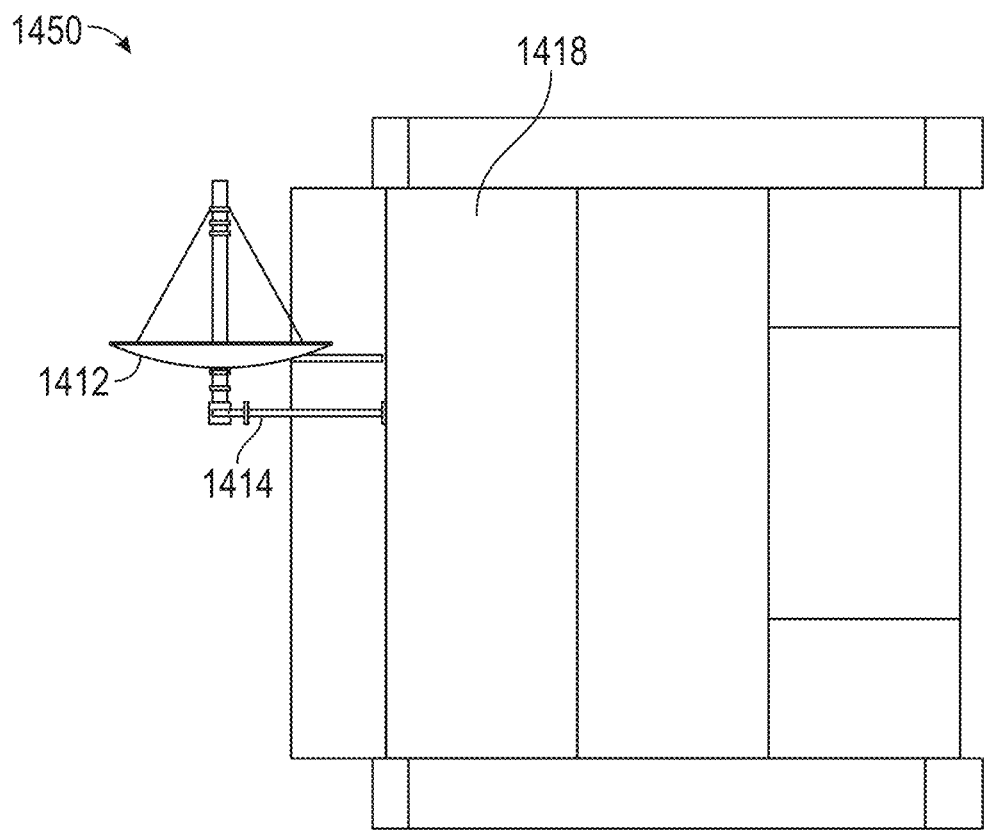
FIG. 15B shows a top view of the robotic applicator module of FIG. 15A.

FIGS. 15A-B show another example of an applicator module 1450 including an articulable waveguide 1414 with an applicator 1412 connected with a klystron microwave generator 1418. The applicator 1412 may be a dish antenna or other form factor that can project energy at a standoff distance farther than the reactive near field applicators to create a focused hot spot. The components of the module 1450 are mounted on a mobility platform 1462. The applicator module 1450 may include other components of the system 100.

Microwave Preconditioning Methods

Figure 16:
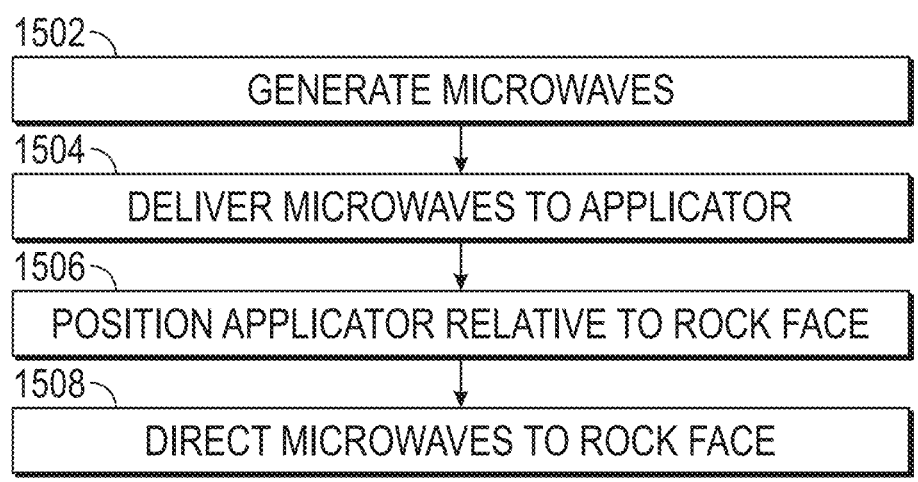
FIG. 16 shows a method of preconditioning a rock using a microwave preconditioning system.

FIG. 16 illustrates a method for excavating a rock face using microwaves. At step 1502, the method may include generating microwaves from a microwave source. The microwave source may be any of the sources discussed above, such as a magnetron, solid-state microwave generator, or klystron. The microwaves may be tuned with an impedance tuner.

At step 1504, the generated microwaves may be guided along a waveguide to an articulable robotic arm comprising a waveguide and supporting an applicator. At step 1506, an articulable robotic arm may position an applicator relative to a rock face. The articulable robotic arm may be adjustable within a range (e.g., x, y, and Z-direction) and/or an orientation of the applicator. At step 1508, the applicator may direct the generated microwaves towards the rock face.

Figure 17:
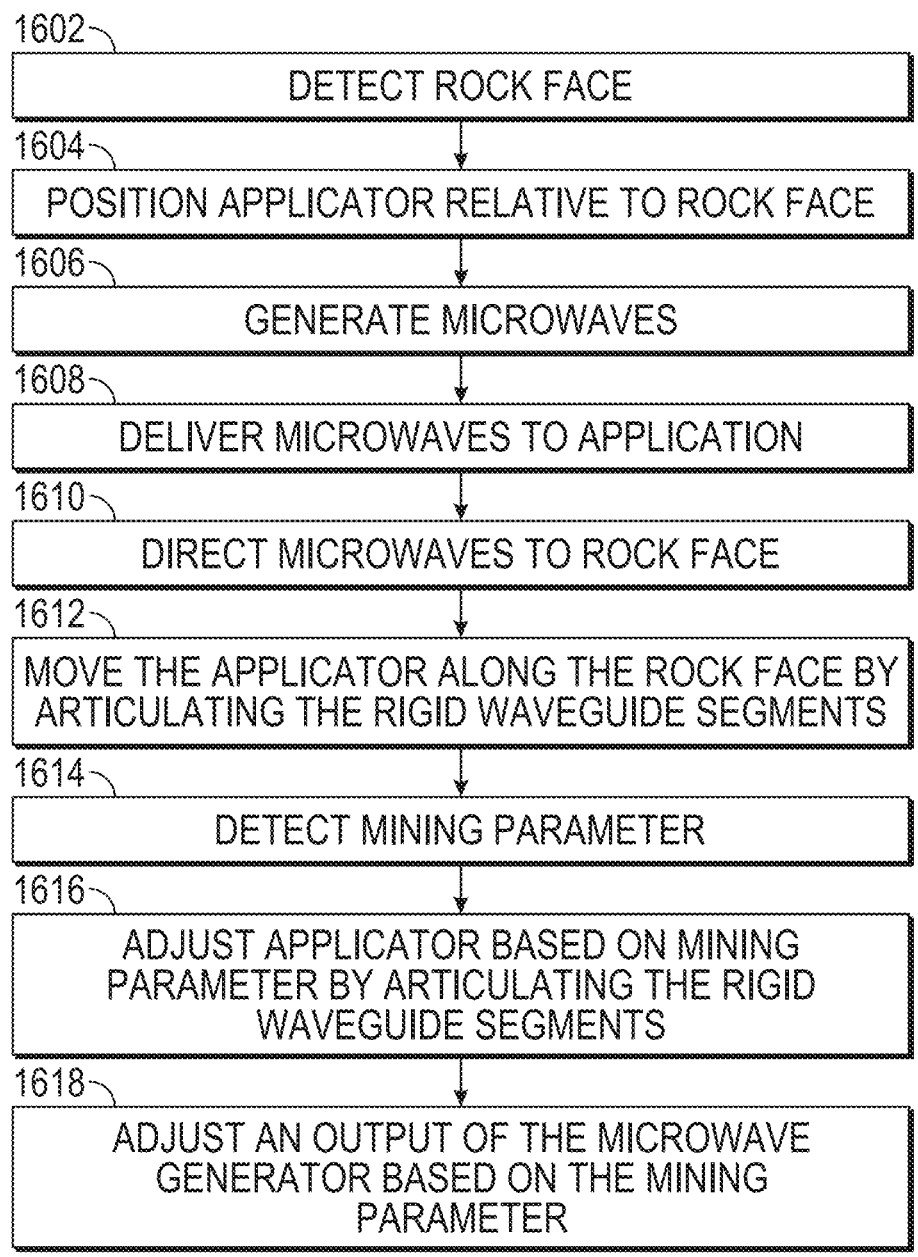
FIG. 17 shows a method for preconditioning a rock using a microwave preconditioning system having a robotic control system including adjusting application of the microwaves based on one or more mining parameters.

FIG. 17 illustrates a method for excavating a rock face using microwaves. At step 1602, the method may include detecting a rock face. Detecting a rock face may include locating a position of the rock face using one or more sensors (e.g., distance or position sensor). Detecting a rock face may include mapping a contour of the rock face (e.g., using machine vision).

At step 1604, an articulable robotic arm may position an applicator relative to the rock face. The positioning may be autonomous based on the positon of the rock face. The positioning may include locating the applicator within a range and/or orienting an angle of the applicator. The positioning may include spacing the applicator from the rock face a distance to control the focus of a microwave beam at the rock face.

At step 1606, the method may include generating microwaves from a microwave source. The microwave source may be any of the sources discussed above, such as a magnetron, solid-state microwave generator, or klystron. The microwaves may be tuned with an impedance tuner. The tuning may be based on matching an impedance of the rock wall (e.g., based on mineral type or density).

At step 1608, the generated microwaves may be guided along a waveguide of an articulable robotic arm to the applicator. At step 1610, the microwaves may be focused and directed at the rock face. The applicator may be spaced from the applicator at a set distance. The distance focus the microwaves to a desired beam size. The distance may be maintained or set using data from one or more distance sensors.

At step 1612, the articulable robotic arm may move the applicator relative to a rock face. The applicator may be moved along the rock face by the articulable arm as the microwaves exit the applicator. The applicator may be moved along the rock face by the articulable robotic arm at a particular speed. The speed may be selected to deliver a desired amount of energy or heat into the rock face. The energy delivered may be sufficient to cause fracturing of the rock face due to thermal expansion. The applicator may be moved along the rock face by the articulable robotic arm along a particular direction along the rock face. The direction may be selected based on a contour (e.g., geometry) of the rock wall. The direction may be based on an application pattern generated to precondition one or more areas of the rock wall. An orientation of the applicator may be selected based on a contour (e.g., geometry) of the rock wall. The movement (e.g., direction or speed) of the application may be based on delivering an amount of energy in the microwaves to the rock wall.

At step 1614, the method may include detecting a mining parameter. The mining parameter may be detected and/or measured using one or more of the sensors of the system. The sensors may detect visible cracks, rock temperatures, total energy delivered, times, or other parameters. The mining parameter may include an amount of microwave energy generated by the generator, an amount of microwave energy exiting the applicator, an amount of microwave energy at one or more joints of the one or more waveguide segments, a type of rock in the rock face, a temperature of the rock face, or a degradation of the rock face At step 1616, the method may include adjusting a position, movement, orientation, speed or other parameter of the applicator based on the mining parameter. In certain example, the system may adjust a focus of the applicator, speed up or slow down a scanning speed of the applicator, redirect the applicator to a different location or position, or other adjustments.

At step 1618, the method may include adjusting a power output of the microwave generator based on the mining parameter. The system may provide more or less microwave power from the microwave generator based on the mining parameter. The movement of the applicator on the articulable robotic arm may be adjusted based on an amount of energy in the microwaves.

Figure 18:
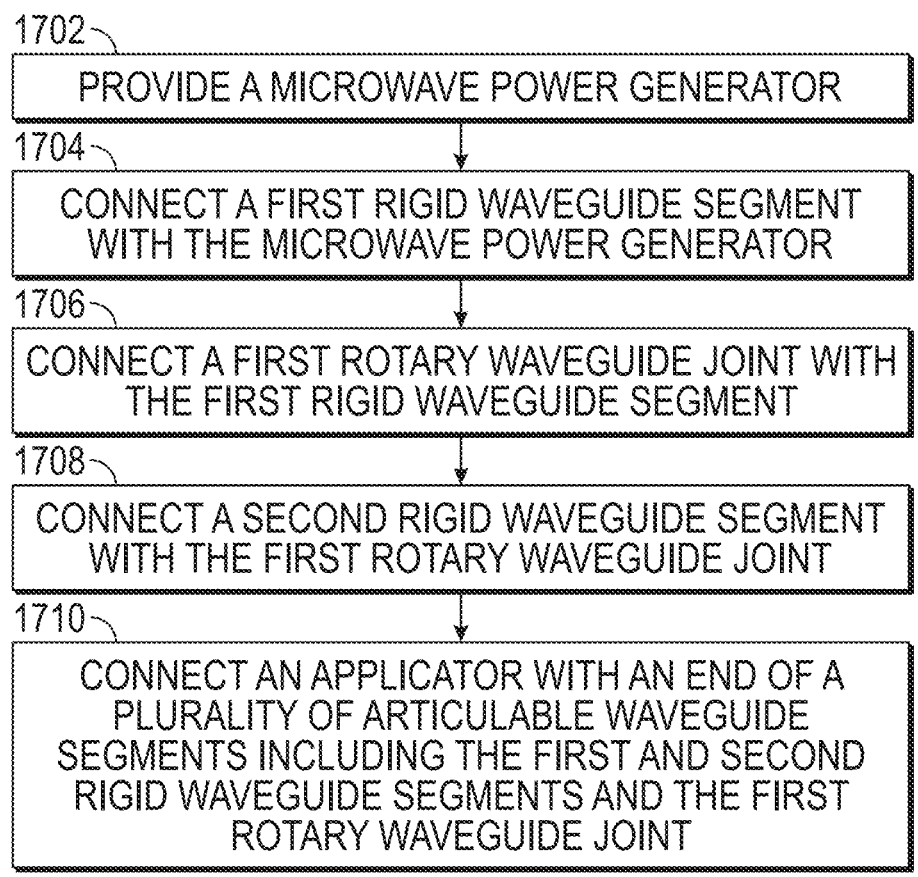
FIG. 18 shows a method of assembling a microwave preconditioning system.

FIG. 18 illustrates a method of assembling a microwave preconditioning system. At step 1702, a microwave generator can be provided. The microwave generator can be a part of a microwave preconditioning system, such as any of the systems described herein (e.g., systems 100, 101, 102, 200, 1100). The microwave generator can be connected with a power source. At step 1704, a first end of a rigid waveguide segment (e.g., waveguide 280) can be connected with an output of the microwave generator. At step 1706, a second end of the rigid waveguide segment can be connected with a first joint (e.g., joint 301). The first joint can be a rotatable waveguide joint. At step 1708, a second waveguide segment (e.g., waveguide segment 311) can be connected with the first joint. The second waveguide segment can thus be articulable relative to the first waveguide segment and the microwave generator about the joint. Any number of additional joints and/or waveguide segments (or none) can be attached with the first and second waveguide segments and first joint to form an articulable waveguide having a distal end. The articulable waveguide can be robotically controlled through a robotic control system (e.g., system 230). At step 1710, an applicator can be connected with the distal end of the articulable waveguide. The applicator (e.g., applicator 212) can be movable using the articulable waveguide and robotic control system to deliver microwave generated at the microwave generator.

Mobile Unit with Curved Applicator

Figure 19:
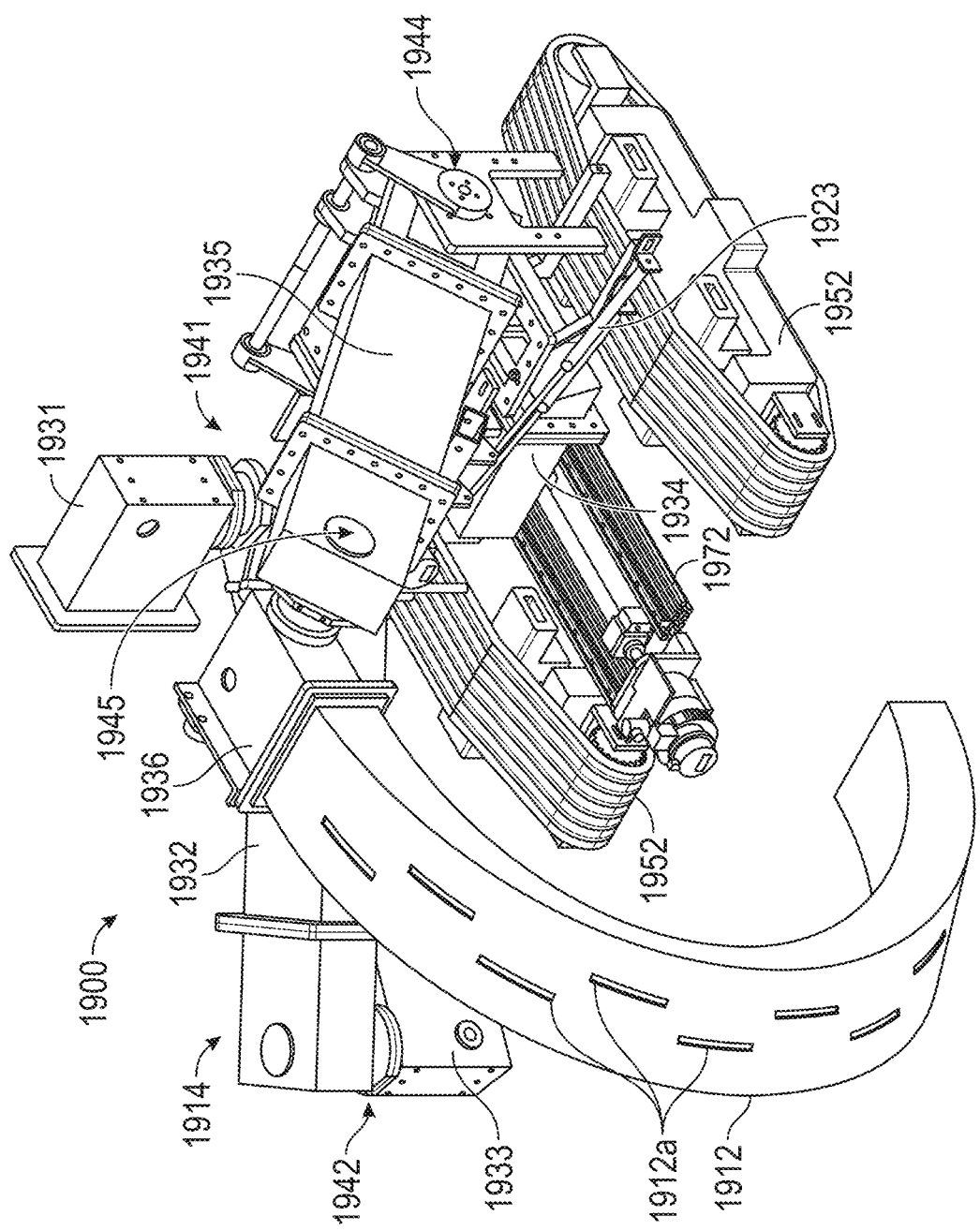
FIG. 19 shows a first perspective view of a mobile microwave applicator unit including an articulable waveguide, a curved applicator, a mobility system and a robotic control system.
Figure 20:
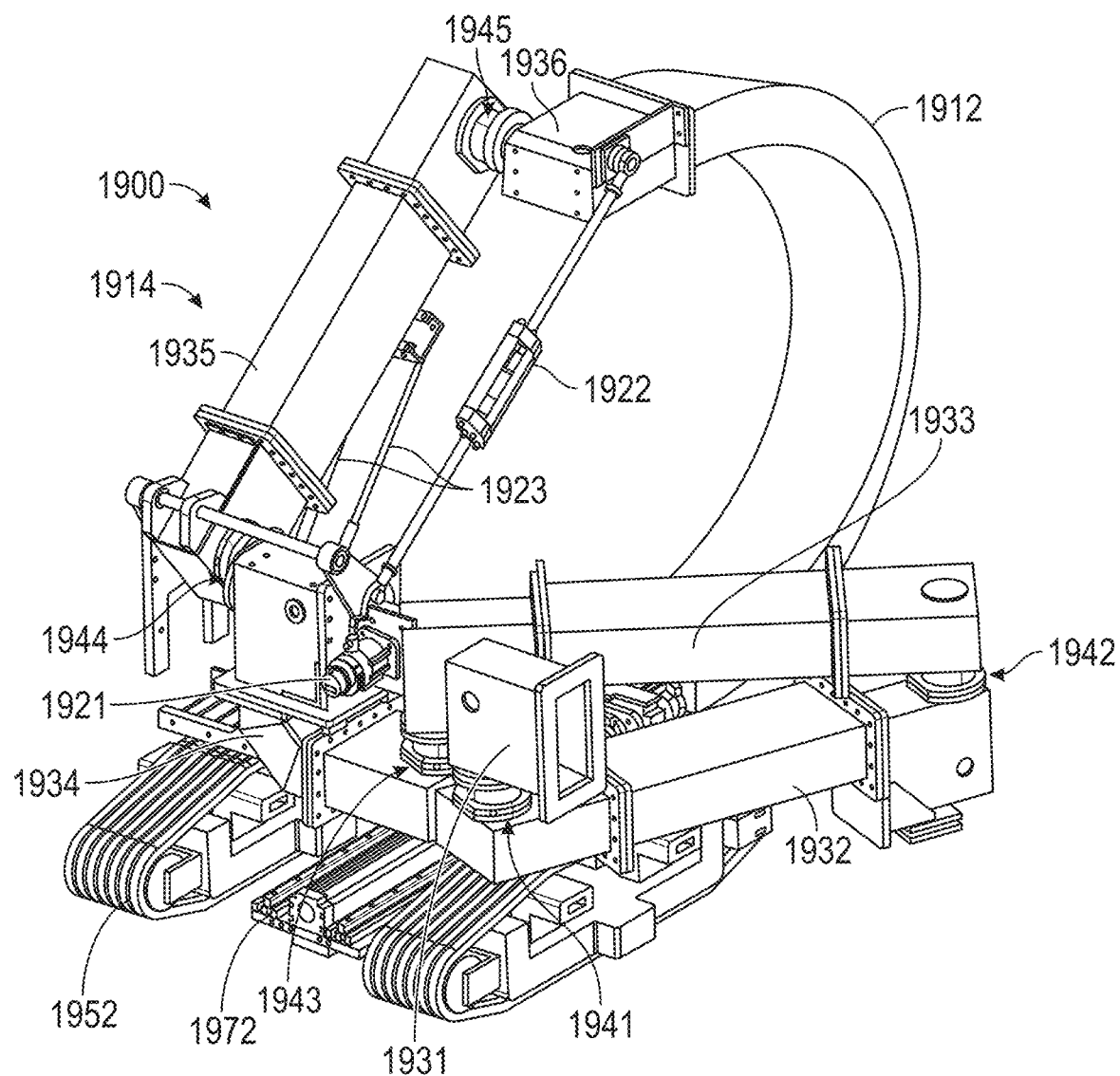
FIG. 20 shows a second perspective view of the mobile microwave applicator unit FIG. 19.

FIGS. 19-20 show another example of a microwave preconditioning system including a mobile microwave applicator module or unit 1900. The unit 1900 may include the components described above in the applicator units 150, 1150. The applicator unit 1950 may include an applicator 1912, an articulable waveguide 1914, and/or a mobility platform 1952. A robotic control system may be included to provide robotic control of the applicator unit 1900.

The applicator 1912 may be a slot antenna. The applicator 1912 can comprise or be an applicator waveguide. The applicator waveguide can have a rectangular cross section. The applicator waveguide may comprise one or more curves between a proximal end and a distal end. The applicator 1912 may comprise a single or multiple waveguide segments forming the applicator waveguide. The applicator 1912 may include the applicator waveguide extending distally away and downward and then extending proximally and downward. The distal end may be curved to extend back towards the mobility platform 1952. The distal end may be closed. The applicator 1912 may include a plurality of slots 1912a within the applicator waveguide. The slots 1912a may be spaced at intervals along the applicator waveguide between the proximal end and the distal end. The slots 1912a may be rectangular gaps through one wall of the applicator waveguide. The slots 1912a may be located on a distal wall of the waveguide applicator to face a rock or other structure for applying energy. A proximal end of the applicator 1912 may be mounted on a distal end of the articulable waveguide 1914.

The articulable waveguide 1914 may comprise a plurality of linear waveguide segments moveably coupled together by corresponding joints, for example as described herein with respect to FIGS. 4A-6 or 12A-15B. The plurality of linear waveguide segments may have a rectangular cross section. The articulable waveguide 1914 may include a first waveguide segment 1931, a second waveguide segment 1932, a third waveguide segment 1933, a fourth waveguide segment 1934 a fifth waveguide segment 1935, and/or a sixth waveguide segment 1936. Rotary joints can connect pairs of adjacent waveguide segments. The rotary joints can include a first joint 1941, a second joint 1942, a third joint 1943, a fourth joint 1944, and/or a fifth joint 1945. All or some of the joints can include an internal antenna, such as any of the antenna described above in relation to the joint 301, for example as described with respect to FIGS. 7A-7B.

The third waveguide segment 1933 can be mounted on a track 1972. The track 1972 can provide for robotic control of the articulable waveguide 1914. The track 1972 can be oriented along a forward-backward line on the mobility platform 1952. The track 1972 can be aligned between two tracks (or pairs of wheels) on opposite sides of the unit 1900. The sixth segment 1936 can be coupled with a control rod 1922 and actuator 1921. The actuator 1921 can provide control of rotation about the fifth joint 1945. A gearbox 1971 can be coupled with the fifth segment 1935 and the fourth joint 1944. The gearbox 1971 can provide control of the fifth segment 1935 about the fourth joint 1944. The articulable waveguide 1914 can comprise 6 degrees of freedom. Alternatively, more or fewer waveguide segments and/or joints can be included to provide more or fewer degrees of freedom.

The articulable waveguide 1914 may be mounted on the mobility platform 1952. The mobility platform 1952 may include a track system. Alternatively, other movement mechanisms such as wheels or legs can be included.

The proximal end of the articulable waveguide 1914 (e.g., first waveguide segment 1931) can be coupled with a microwave generator (not shown). The articulable waveguide 1914 can be configured to guide microwaves therethrough to the applicator 1912. The microwave generator can be mounted on a separate unit of the system (e.g., generator unit 260). The separate unit may include a mobility system that operated independently from the mobility system 1952. One or more other portions of the articulable waveguide 1914 can be mounted on the separate unit. The second joint 1942 can be mounted on the separate unit to provide enhanced movement of the articulable waveguide 1914.

A robotic control system may govern operation of the unit 1900. The control may be autonomous and/or remotely controlled by a human operator. The robotic control system can include any of the features, sensors, etc. described herein, for example for the systems 100, 200, 1100.

Certain Terminology

Terms of orientation used herein, such as "top," "bottom," "proximal," "distal," "longitudinal," "lateral," and "end,"

are used in the context of the illustrated example. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that may be measured from side-to-side. Terms relating to shapes generally, such as "circular," "cylindrical," "semi-circular," or "semi-cylindrical" or any related or similar terms, are not required to conform strictly to the mathematical definitions of circles or cylinders or other structures, but may encompass structures that are reasonably close approximations.

Conditional language, such as "can," "could," "might," or "may," unless specifically stated otherwise, or otherwise understood within the context as used, is generally intended to convey that certain examples include or do not include, certain features, elements, and/or steps. Thus, such conditional language is not generally intended to imply that features, elements, and/or steps are in any way required for one or more examples.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain examples require the presence of at least one of X, at least one of Y, and at least one of Z.

The terms "approximately," "about," and "substantially" as used herein represent an amount close to the stated amount that still performs a desired function or achieves a desired result. For example, in some examples, as the context may dictate, the terms "approximately," "about," and "substantially," may refer to an amount that is within less than or equal to 10% of the stated amount. The term "generally" as used herein represents a value, amount, or characteristic that predominantly includes or tends toward a particular value, amount, or characteristic. As an example, in certain examples, as the context may dictate, the term "generally parallel" may refer to something that departs from exactly parallel by less than or equal to 20 degrees. All ranges are inclusive of endpoints.

Several illustrative examples of microwave preconditioning systems have been disclosed. Although this disclosure has been described in terms of certain illustrative examples and uses, other examples and other uses, including examples and uses which do not provide all of the features and advantages set forth herein, are also within the scope of this disclosure. Components, elements, features, acts, or steps may be arranged or performed differently than described and components, elements, features, acts, or steps may be combined, merged, added, or left out in various examples. All possible combinations and subcombinations of elements and components described herein are intended to be included in this disclosure. No single feature or group of features is necessary or indispensable.

Certain features that are described in this disclosure in the context of separate implementations may also be implemented in combination in a single implementation. Conversely, various features that are described in the context of a single implementation also may be implemented in multiple implementations separately or in any suitable subcombination. Moreover, although features may be described above as acting in certain combinations, one or more features from a claimed combination may in some cases be excised from the combination, and the combination may be claimed as a subcombination or variation of a subcombination.

Any portion of any of the steps, processes, structures, and/or devices disclosed or illustrated in one example in this disclosure may be combined or used with (or instead of) any other portion of any of the steps, processes, structures, and/or devices disclosed or illustrated in a different example or flowchart. The examples described herein are not intended to be discrete and separate from each other. Combinations, variations, and some implementations of the disclosed features are within the scope of this disclosure.

While operations may be depicted in the drawings or described in the specification in a particular order, such operations need not be performed in the particular order shown or in sequential order, or that all operations be performed, to achieve desirable results. Other operations that are not depicted or described may be incorporated in the example methods and processes. For example, one or more additional operations may be performed before, after, simultaneously, or between any of the described operations. Additionally, the operations may be rearranged or reordered in some implementations. Also, the separation of various components in the implementations described above should not be understood as requiring such separation in all implementations, and it should be understood that the described components and systems may generally be integrated together in a single product or packaged into multiple products. Additionally, some implementations are within the scope of this disclosure.

Further, while illustrative examples have been described, any examples having equivalent elements, modifications, omissions, and/or combinations are also within the scope of this disclosure. Moreover, although certain aspects, advantages, and novel features are described herein, not necessarily all such advantages may be achieved in accordance with any particular example. For example, some examples within the scope of this disclosure achieve one advantage, or a group of advantages, as taught herein without necessarily achieving other advantages taught or suggested herein. Further, some examples may achieve different advantages than those taught or suggested herein.

Some examples have been described in connection with the accompanying drawings. The figures are drawn and/or shown to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components may be added, removed, and/or rearranged. Further, the disclosure herein of any particular feature, aspect, method, property, characteristic, quality, attribute, element, or the like in connection with various examples may be used in all other examples set forth herein. Additionally, any methods described herein may be practiced using any device suitable for performing the recited steps.

For purposes of summarizing the disclosure, certain aspects, advantages and features of the inventions have been described herein. Not all, or any such advantages are necessarily achieved in accordance with any particular example of the inventions disclosed herein. No aspects of this disclosure are essential or indispensable. In many examples, the devices, systems, and methods may be configured differently than illustrated in the figures or description herein. For example, various functionalities provided by the illustrated modules may be combined, rearranged, added, or deleted. In some implementations, additional or different processors or modules may perform some or all of the functionalities described with reference to the examples described and illustrated in the figures. Many implementation variations are possible. Any of the features, structures, steps, or processes disclosed in this specification may be included in any example.

In summary, various examples of microwave preconditioning systems and related methods have been disclosed. This disclosure extends beyond the specifically disclosed examples to other alternative examples and/or other uses of the examples, as well as to certain modifications and equivalents thereof. Moreover, this disclosure expressly contemplates that various features and aspects of the disclosed examples may be combined with, or substituted for, one another. Accordingly, the scope of this disclosure should not be limited by the particular disclosed examples described above, but should be determined only by a fair reading of the claims.

What is claimed is:

1. A system for excavating a rock face using microwaves, the system comprising:
    a microwave generator;
    an articulable robotic arm comprising a plurality of rotatably connected waveguide segments, the plurality of rotatably connected waveguide segments being rigid;
    an applicator attached to a distal end of the articulable robotic arm; and
    a control system comprising one or more sensors, the control system configured to:
        produce microwaves with the microwave generator for travel through the plurality of rotatably connected waveguide segments to the applicator,
        move the articulable robotic arm such that the applicator moves along the rock face as the microwaves exit the applicator,
        wherein the control system is configured to detect a microwave mining parameter using the one or more sensors and to control production of the microwaves and movement of the articulable robotic arm based on the microwave mining parameter.

2. The system of claim 1, wherein the applicator is configured to focus the microwaves to produce a microwave beam at the rock face.

3. The system of claim 1, wherein the applicator includes a tapered internal channel that reduces in width to an exit port.

4. The system of claim 1, wherein the control system is further configured to move the articulable robotic arm such that the applicator moves at a scan speed along the rock face.

5. The system of claim 1, wherein the control system is further configured to move the applicator within a vertically oriented plane.

6. The system of claim 1, wherein the control system is further configured to move the articulable robotic arm such that the applicator moves in a particular direction along the rock face.

7. The system of claim 1, wherein the control system is further configured to move the articulable robotic arm such that the applicator moves with a particular orientation relative to a contour of the rock face.

8. The system of claim 1, wherein the control system is further configured to move the articulable robotic arm based on an amount of energy in the microwaves.

9. The system of claim 1, wherein the microwave mining parameter comprises one or more of the following: an amount of microwave energy generated by the microwave generator, an amount of microwave energy exiting the applicator, an amount of microwave energy at one or more joints of the plurality of rotatably connected waveguide segments, a type of rock in the rock face, a temperature of the rock face, and a degradation of the rock face.

10. The system of claim 9, wherein the control system is further configured to control one or more of the following based on the microwave mining parameter: an orientation of the applicator relative to the rock face, a direction of movement of the applicator along the rock face, and a speed of movement of the applicator along the rock face.

11. The system of claim 1, wherein the plurality of rotatably connected waveguide segments are connected at rotatable joints comprising internal antennas.

12. The system of claim 11, wherein the internal antennas comprise a cylindrical shape.

13. The system of claim 11, wherein the internal antennas are T-shaped.

14. The system of claim 1, wherein the control system is further configured to:
    detect a topography of the rock face using the one or more sensors;
    map a topography of the rock face; and
    move the articulable robotic arm based in part on the detected topography.

15. A method for excavating a rock face using microwaves, the method comprising:
    generating microwaves from a microwave source;
    guiding the microwaves along a waveguide to an articulable robotic arm comprising one or more articulable waveguide segments;
    adjusting one or more of the articulable waveguide segments to position an applicator on the articulable robotic arm relative to the rock face,
    detecting a microwave mining parameter and adjusting generation of the microwaves and movement of the applicator based on the microwave mining parameter; and
    directing the microwaves through the applicator and onto the rock face.

16. The method of claim 15, further comprising:
    moving the articulable robotic arm such that the applicator moves along the rock face as the microwaves exit the applicator.

17. The method of claim 15, further comprising:
    focusing the microwaves to produce a microwave beam at the rock face.

18. The method of claim 15, wherein the applicator includes a tapered internal channel that reduces in width to an exit port.

19. The method of claim 15, further comprising:
    moving the applicator at a particular speed along the rock face.

20. The method of claim 15, further comprising:
    moving the applicator in a particular direction along the rock face.

21. The method of claim 15, further comprising:
    orientating the applicator relative to a contour of the rock face.

22. The method of claim 15, further comprising:
    moving the articulable robotic arm based on an amount of energy in the microwaves.

23. The method of claim 15, wherein the microwave mining parameter comprises one or more of the following: an amount of microwave energy generated by the microwave source, an amount of microwave energy exiting the applicator, an amount of microwave energy at one or more joints of the one or more waveguide segments, a type of rock in the rock face, a temperature of the rock face, and a degradation of the rock face.

24. The method of claim 23, further comprising:
adjusting one or more of the following based on the microwave mining parameter: an orientation of the applicator relative to the rock face, a direction of movement of the applicator along the rock face, and a speed of movement of the applicator along the rock face.

25. The method of claim 15, wherein the one or more articulable waveguide segments include a plurality of rotatably connected waveguide segments comprising internal antennas.

26. The method of claim 25, wherein the internal antennas are T-shaped.

27. The method of claim 15, further comprising:
detecting a topography of the rock face using one or more sensors;
mapping a topography of the rock face; and
adjusting one or more of the articulable waveguide segments to position an applicator on the articulable robotic arm relative to the rock face, based in part on the detected topography.

* * * * *